US011867220B2

(12) United States Patent
Hersh

(10) Patent No.: US 11,867,220 B2
(45) Date of Patent: Jan. 9, 2024

(54) FASTENER

(71) Applicant: Sentient Design, Inc., San Diego, CA (US)

(72) Inventor: Douglas E. Hersh, San Diego, CA (US)

(*) Notice: Subject to any disclaimer, the term of this patent is extended or adjusted under 35 U.S.C. 154(b) by 0 days.

(21) Appl. No.: 17/986,848

(22) Filed: Nov. 14, 2022

(65) Prior Publication Data
US 2023/0074263 A1  Mar. 9, 2023

Related U.S. Application Data

(63) Continuation of application No. 16/537,322, filed on Aug. 9, 2019, now Pat. No. 11,499,585.

(60) Provisional application No. 62/764,574, filed on Aug. 9, 2018.

(51) Int. Cl.
*F16B 39/26* (2006.01)

(52) U.S. Cl.
CPC .................... *F16B 39/26* (2013.01)

(58) Field of Classification Search
CPC ........ F16B 33/002; F16B 33/02; F16B 39/00; F16B 39/14; F16B 39/26; F16B 39/30; Y10S 411/924
USPC .... 411/190, 259, 337, 366.1, 383, 411, 417, 411/508–510
See application file for complete search history.

(56) References Cited

U.S. PATENT DOCUMENTS

| | | | | |
|---|---|---|---|---|
| 154,864 A * | 9/1874 | Harvey | ................... | F16B 25/00 411/929 |
| 361,289 A * | 4/1887 | Howes | ..................... | F16B 39/30 411/938 |
| 2,036,604 A * | 4/1936 | Pickop | .................... | F16B 39/30 411/929 |
| 3,439,722 A * | 4/1969 | Brandon | ............. | F16B 37/0885 411/929 |
| 3,664,540 A * | 5/1972 | Witkin | ................... | B65D 39/08 220/582 |
| 4,278,005 A * | 7/1981 | Lachner | .................. | B25B 29/02 411/417 |
| 4,840,526 A * | 6/1989 | Bourdonne | ............. | B25B 29/02 411/366.3 |
| 5,061,135 A * | 10/1991 | Pritchard | ............ | F16B 25/0015 411/411 |
| 5,379,505 A * | 1/1995 | Reed | ........................ | B23G 5/06 29/888.011 |
| 5,391,031 A * | 2/1995 | Medal | ................... | F16B 37/048 411/908 |
| 10,208,785 B2 * | 2/2019 | Tamer | ..................... | F16B 39/32 |
| 2005/0175432 A1 * | 8/2005 | Su | ....................... | F16B 25/0015 411/417 |

(Continued)

*Primary Examiner* — Roberta S Delisle
(74) *Attorney, Agent, or Firm* — Rimas T. Lukas

(57) ABSTRACT

A nut-and-bolt fastener is provided. The nut and bolt are configured with a plurality of interlocking teeth that provide unidirectional travel of the nut with respect to the bolt. In particular, the configuration of the teeth arrest separation of the nut from the bolt while permitting the nut to move toward the head of the bolt into a fastened engagement. The teeth are non-helical and arranged concentrically around the longitudinal axis in evenly-spaced steps or segments along the longitudinal axis and around the shaft of the bolt and bore of the nut. Integral winged washers are provided on the bolt head as well as on the nut. Variations with different rake angles of the teeth as well as an expandable nut are also provided.

19 Claims, 26 Drawing Sheets

(56) References Cited

U.S. PATENT DOCUMENTS

2017/0321742 A1* 11/2017 Tamer .................... F16B 39/32

* cited by examiner

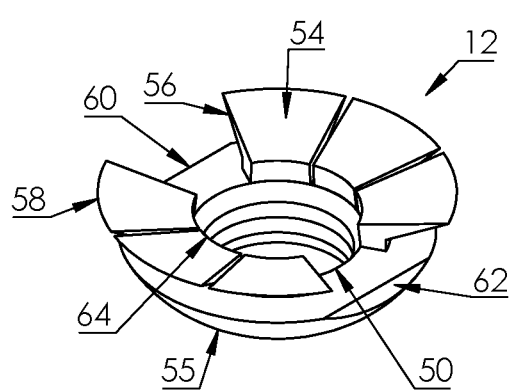
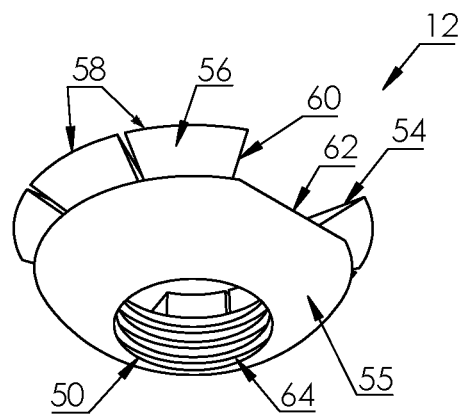
Figure 8　　　　　Figure 9
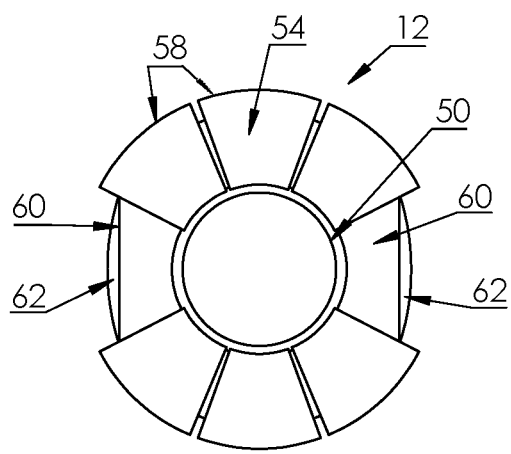
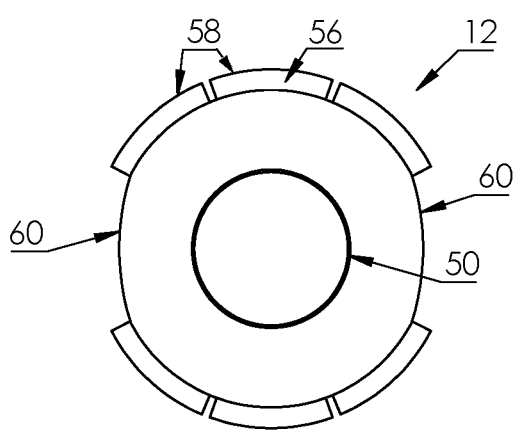
Figure 10　　　　　Figure 11 a = 0.25-1.00 mm a = 0.25 - 1.00 mm

FASTENER

CROSS-REFERENCE TO RELATED APPLICATIONS

This application is a continuation of U.S. patent application Ser. No. 16/537,322 entitled "Fastener" filed on Aug. 9, 2019 now U.S. Pat. No. 11,499,585 which claims priority and benefit of U.S. Provisional Patent Application Ser. No. 62/764,574 entitled "Rachet-toothed fastener" filed on Aug. 9, 2018, all of which are incorporated by reference in their entireties herein.

FIELD OF THE INVENTION

This application relates generally to fasteners, and in particular, to nut-and-bolt-type fasteners.

BACKGROUND OF THE INVENTION

Typical nut-and-bolt fasteners include a bolt having a helically threaded shank portion that threads together with a mating nut having a corresponding internal thread. The thread is a helical structure used to convert between rotational and linear movement or force. The screw thread is a ridge wrapped around the cylinder in the form of a helix. The cylinder may have a taper at the end in which case a tapered thread is formed as opposed to a straight thread on a cylinder without a taper. The mechanical advantage of a screw thread depends on its lead which is the linear distance the screw travels in one revolution. In most applications, the lead of a screw is chosen so that friction is sufficient to prevent linear motion being converted to rotary motion, that is so the screw does not slip even when linear force is applied as long as no external rotational force is present. The nut and bolt are kept together by a combination of the friction of their threads with a slight elastic deformation, a slight stretching of the bolt and compression of the parts held together between the nut and the bolt.

These typical nut-and-bolt fasteners have several disadvantages. For example, rotational movement is required to move the nut along the longitudinal axis of the bolt. To effect rotation, rotational force must be applied to rotate the nut relative to the bolt. This rotational force is supplied directly by hand or indirectly with a tool such as a driver or wrench. If the rotational force is applied with a tool, the tool must be appropriately sized and configured to engage with either the bolt or nut. For example, an appropriately sized wrench is employed to engage the hexagonal shape of the nut or head of the bolt. If the bolt is configured with a socket, an appropriately sized and shaped driver is required. In essence, different tools are required for different conventional bolts and nuts.

Furthermore, bolts of the different lengths must be stocked and employed for different applications because cutting a bolt to an appropriate length is costly, difficult and may damage the fastener. After a fastener and corresponding tool is selected, time must be taken to align the nut and bolt with each other so that they are not angled with respect to each other in order to prevent cross-threading. When rotational force is supplied to a nut or bolt, sometimes both the nut and bolt will rotate together due to higher rotational friction in threaded fasteners. In order to torque the nut with respect to the bolt, the bolt is kept stationary. This may require two tools to be employed. Furthermore, sufficient torque must be applied to tighten the nut and bolt. In some circumstances, it is not possible to completely rotationally tighten the fastener, for example, due to spatial limitations. Over-torquing and under-torquing can create problems. Also, applying torque in zero gravity such as outer space is nearly impossible without the source of torque, whether person or instrument, being strapped or connected in place to prevent counter rotation.

Furthermore, vibration or rotation may work a nut loose with respect to the bolt. Such loosening can cause the fastener to fall out or fail. A loosened or lost fastener can result in catastrophic damage and accidents to persons and equipment including automobiles, armatures, buildings and bridges. Missing or loose fasteners have been known to cause fatal airplane crashes. To prevent fasteners from loosening, various locking constructs and anti-backout mechanisms are needed as secondary means for keeping fasteners in place. The present invention as described in the detailed description sets forth an improved nut-and-bolt-type fastener that overcomes these disadvantages.

SUMMARY OF THE INVENTION

According to one aspect of the invention, a fastener is provided. The fastener includes a bolt having a head at a proximal end and a cylindrical shaft extending from the head to a distal end along a central longitudinal axis. The head has a diameter larger than the shaft. The bolt includes a plurality of non-helical, uniformly-spaced teeth formed in rings circumferentially around the shaft. Each tooth has a load-bearing surface facing the proximal end. The fastener includes a nut defining a cylindrical bore extending through the nut along the longitudinal axis from a proximal end to a distal end of the nut. The bore is sized and configured to receive the shaft inside the bore. The nut includes a plurality of non-helical, uniformly-spaced ridges formed in rings circumferentially around the bore. Each ridge has a load-bearing surface facing the distal end. Each ridge is sized and configured to mate between the teeth such that the load-bearing surfaces of the teeth abut the load-bearing surfaces of the ridges such that, with the shaft inside the bore, the nut is configured to move along the bolt only in a direction toward the head.

According to another aspect of the invention, a fastener is provided. The fastener includes a bolt having a head at a proximal end and a cylindrical shaft extending from the head to a distal end along a central longitudinal axis. The head has a diameter larger than the shaft. The bolt includes a plurality of toothed segments around the shaft and along the longitudinal axis. Each toothed segment includes individual teeth all having a load-bearing surface facing the proximal end. The bolt includes a plurality of blank segments interspersed between toothed segments around the shaft and along the longitudinal axis. The fastener includes a nut defining a cylindrical bore extending through the nut along the longitudinal axis from a proximal end to a distal end of the nut. The bore has a bore surface. The bore is sized and configured to receive the shaft of the bolt inside the bore. The nut includes a plurality of teeth on the bore surface. Each tooth on the nut has a load-bearing surface facing the distal end and sized and configured to abut against the load-bearing surfaces of the teeth on the shaft to prevent translation of the nut in the distal direction and allow translation of the nut in the proximal direction toward the head.

According to another aspect of the invention, a fastener is provided. The fastener includes a bolt having a head at a proximal end and a cylindrical shaft extending from the head to a distal end along a central longitudinal axis. The head has a diameter larger than the shaft. The bolt includes a plurality of teeth around the shaft and along the longitudinal axis. Each tooth has a load-bearing surface facing the proximal end. The fastener includes a nut defining a cylindrical bore extending through the nut along the longitudinal axis from a proximal end to a distal end of the nut. The bore includes a bore surface. The bore is sized and configured to receive the shaft of the bolt inside the bore. The nut includes two or more oppositely disposed ridged portions interconnected by two or more oppositely disposed expandable portions. Each ridged portion includes a plurality of ridges located on the bore surface. Each ridge has a load-bearing surface facing the distal end and is sized and configured to abut the load-bearing surfaces of the teeth to prevent translation of the nut in the distal direction and allow translation of the nut in the proximal direction toward the head. The expandable portions are configured to expand to increase the diameter of the bore.

According to another aspect of the invention, a fastener is provided. The fastener includes a bolt having a head at a proximal end and a cylindrical shaft extending from the head to a distal end along a central longitudinal axis. The head has a diameter larger than the shaft. The bolt includes a plurality of flexible toothed segments around the shaft and along the longitudinal axis. Each toothed segment includes individual teeth all having a load-bearing surface facing the proximal end. The plurality of toothed segments are arranged in a diamond-like overlapping pattern. The fastener includes a nut defining a cylindrical bore extending through the nut along the longitudinal axis from a proximal end to a distal end of the nut. The bore has a bore surface. The bore is sized and configured to receive the shaft of the bolt inside the bore. The nut includes a plurality of teeth on the bore surface. Each tooth on the nut has a load-bearing surface facing the distal end and sized and configured to abut against the load-bearing surfaces of the teeth on the shaft to prevent translation of the nut in the distal direction and allow translation of the nut in the proximal direction toward the head

BRIEF DESCRIPTION OF THE DRAWINGS

FIG. 8 is a top perspective view of a nut according to the present invention.

FIG. 9 is a bottom perspective view of a nut according to the present invention.

FIG. 10 is a top view of a nut according to the present invention.

FIG. 11 is a bottom view of nut according to the present invention.

DETAILED DESCRIPTION OF THE INVENTION

Figure 1:
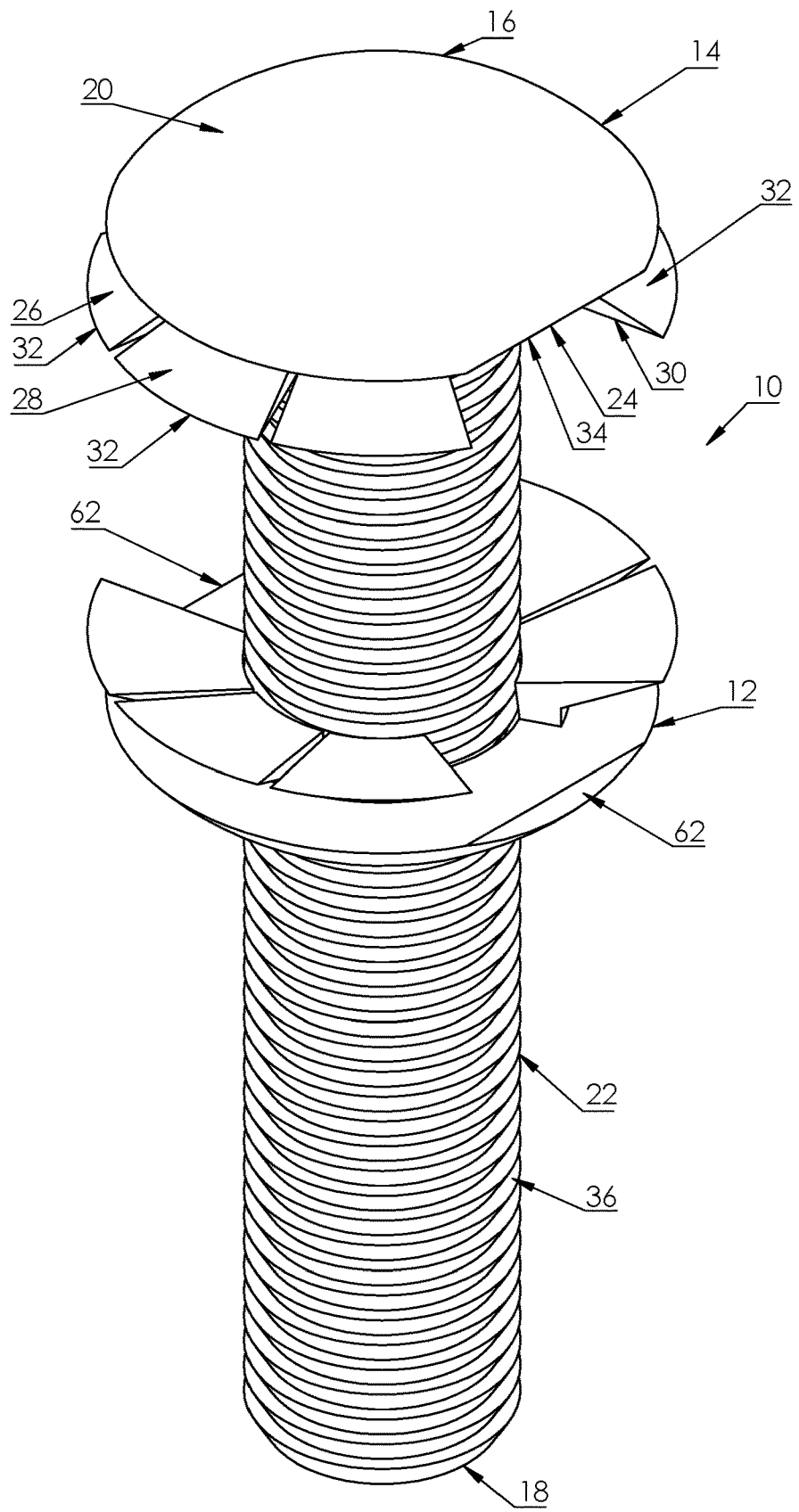
FIG. 1 is a top perspective view of a fastener according to the present invention.
Figure 2:
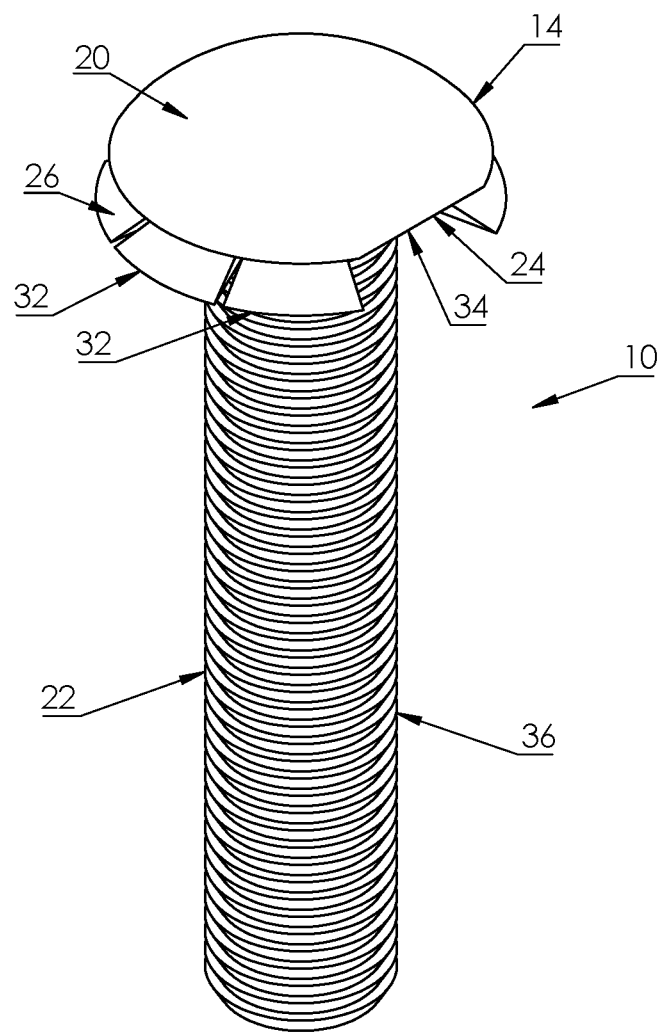
FIG. 2 is an exploded view of a fastener according to the present invention.
Figure 2:
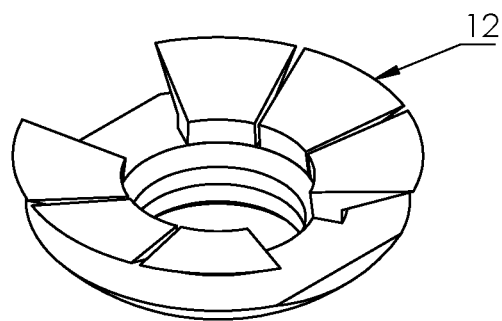

FIGS. 1-10 depict a fastener 10 according to one variation of the invention. The fastener 10 comprises a first part connectable to a second part and configured to fasten together one or more objects therebetween. The first part and the second part of the fastener 10 take the form of a nut 12 and a bolt 14. The bolt 14 comprises an elongate body extending between a proximal end 16 and a distal end 18 along a central longitudinal axis. The elongate body is divided into two sections: a head 20 at the proximal end connected to a cylindrical shank 22 extending to the distal end 18.

Figure 3:
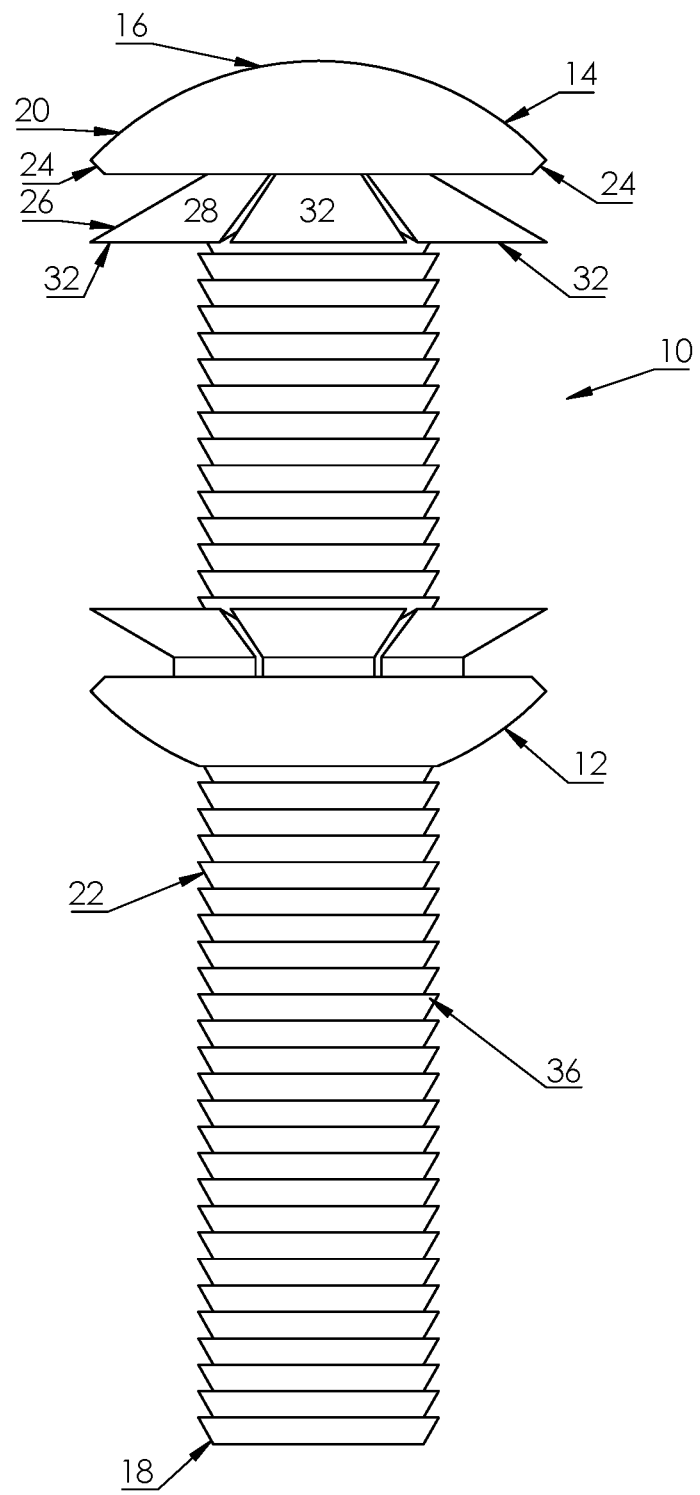
FIG. 3 is a side elevational view of a fastener according to the present invention.
Figure 4:
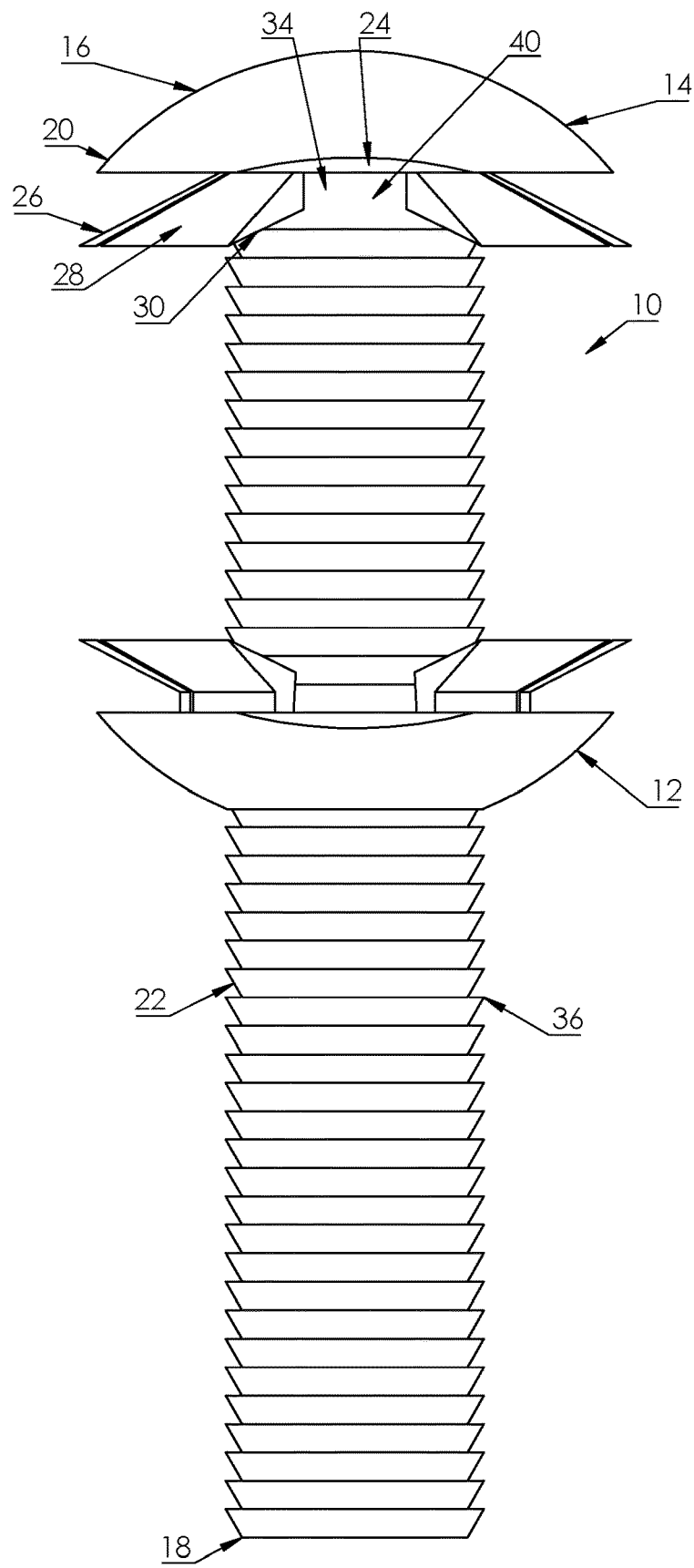
FIG. 4 is a side elevational view of a fastener according to the present invention.
Figure 5:
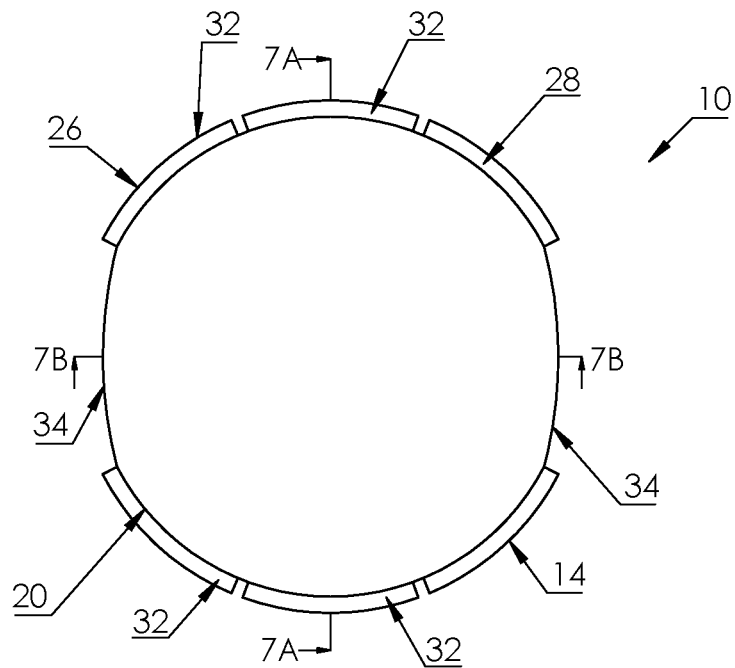
FIG. 5 is a top view of a fastener according to the present invention.
Figure 6:
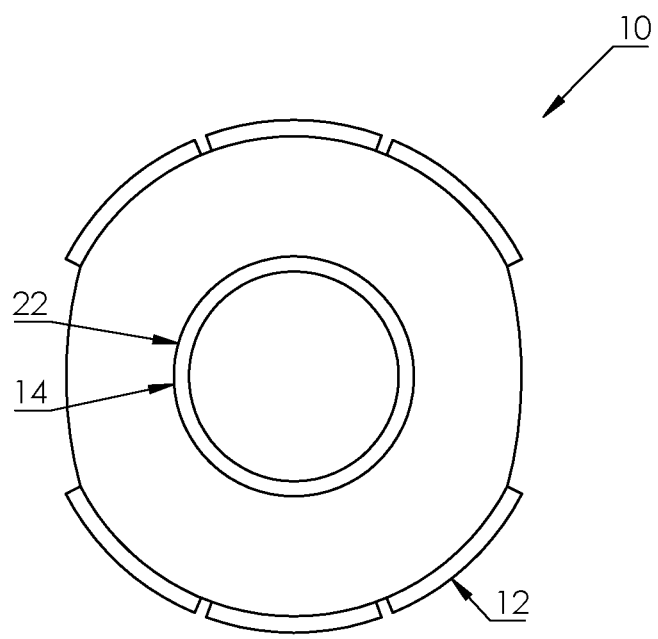
FIG. 6 is a bottom view of a fastener according to the present invention.

The head 20 at the proximal end 16 defines a workable end that is adapted to be worked or gripped by a hand, power tool or robot for handling and manipulating the bolt 14. The head 20 has a diameter larger than the diameter of the shank 22. The head 20 has a domed top surface and a flat undersurface meeting at a tapered perimeter as can be seen in FIGS. 3-4. The head 20 is circular in shape. In another variation, the head 20 is elongated or elliptical in shape as can be seen in FIGS. 5-6. Each of the oppositely disposed longer sides of the elongated head 20 include a flat surface or chamfer 24. The elongated shape and chamfers 24 of the head 20 will be discussed in greater detail below. Advantageously, the domed surface of the head 20 does not have any socket or outer surface configured for engaging an instrument to drive the bolt 14.

In one variation, the head 20 includes a washer 26 integrally formed with the bolt 14 as a unitary element. The integral washer 26 advantageously avoids loose separate parts and their assembly on site. The washer 26 has an upper surface 28 and a lower surface 30 meeting at a tapered outer perimeter. The washer 26 substantially encompasses the cylindrical shank 22. In one variation, the upper surface 28 and lower surface 30 are angled downwardly to create a truncated conical lower surface 30. The lower surface 30 of the disc-like washer 26 is slightly conical, concave, angled, curved, cone-shaped, spherical, domed or cupped. Because of the shape of the lower surface 30, the washer 26 is functionable as a spring washer or conical washer which advantageously provides an axial force when deformed under compression. The conical shell of the washer 26 can be loaded in the longitudinal direction and the force transmission is generally concentric. In one variation, the washer 26 of the present invention is provided with a plurality of radial serrations dividing the washer 26 into segments or wings 30. There is an absence of one or more segment/wing 30 in opposite locations on the washer 26 forming openings 34 between the wings 30 for accessing the shank 22 which will be described in greater detail below. In the variation in which the head 20 is elongated, the openings 34 are located along the long sides of the head 20 as can be seen in FIG. 5. The washer 26 including one or more of the wings 30 either together or independently are configured to flex, bend, deflect, deform upwardly towards the head 20 and provide a spring force in the opposite axial direction against a fastened object to improve the locking capabilities of the fastener. Unless plastically deformed, the washer 26 will return to its original undeflected configuration. The individual wings 30 can flex independently and, thereby, more closely conform to a non-smooth, irregular surface.

The shank 22 now will be described in greater detail. The shank or shaft 22 includes a toothed portion 36 having a plurality of teeth 38 along the length of the shank 22. In one variation, the shank 22 has a body portion 40 without teeth 38 located between the toothed portion 36 and the head 20 as can be seen in FIG. 4. In one variation, the body portion 40 is cylindrical; however, the invention is not so limited, and the body portion may include flat surfaces or have a non-circular cross-sectional shape.

Each tooth 38 is formed circumferentially around the shank 22 at a constant distance along the longitudinal axis. Therefore, the toothed portion 36 is not threaded as there is no helical shape formed in the teeth. The lead of a threaded shaft is known to be the distance along the longitudinal axis that a threaded nut travels on the threads of a bolt in one revolution of the nut around the longitudinal axis of the bolt with rotation of the nut being about the longitudinal axis. In the present invention, since there are no helical threads, the lead is zero, that is, a revolution of the nut 12 of the present invention with respect to the bolt 14 around the longitudinal axis does not translate the nut 12 along the longitudinal axis. As such, each tooth 38 is a separate circular, annular, non-helical groove or ring interconnected with itself around the cylindrical shank 22 and a plurality of evenly separated grooves or steps are formed along the length of the longitudinal axis in the toothed portion 36 with each groove lying in separate parallel planes all of which are perpendicular and concentric to the longitudinal axis and annular wherein the distance between adjacent parallel planes is called the pitch in the present invention. There are approximately 20-60 teeth per inch along the longitudinal axis.

Figure 16:
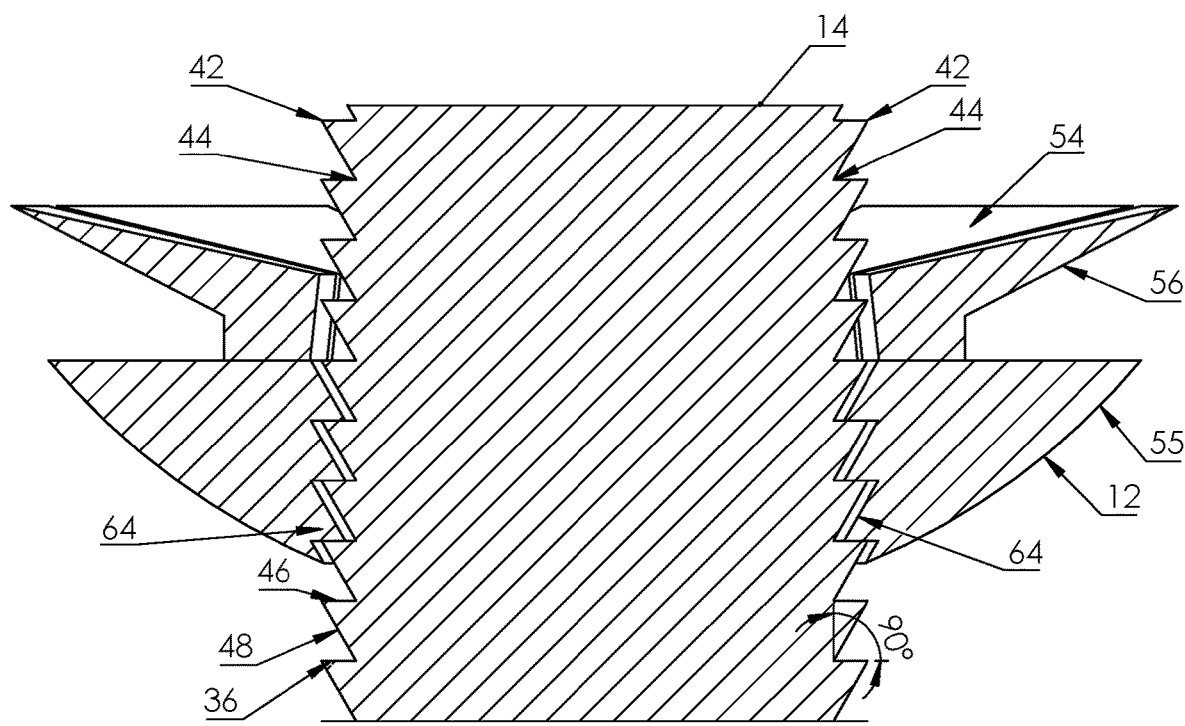
FIG. 16 is a sectional view of a fastener in an engaged configuration according to the present invention.
Figure 17:
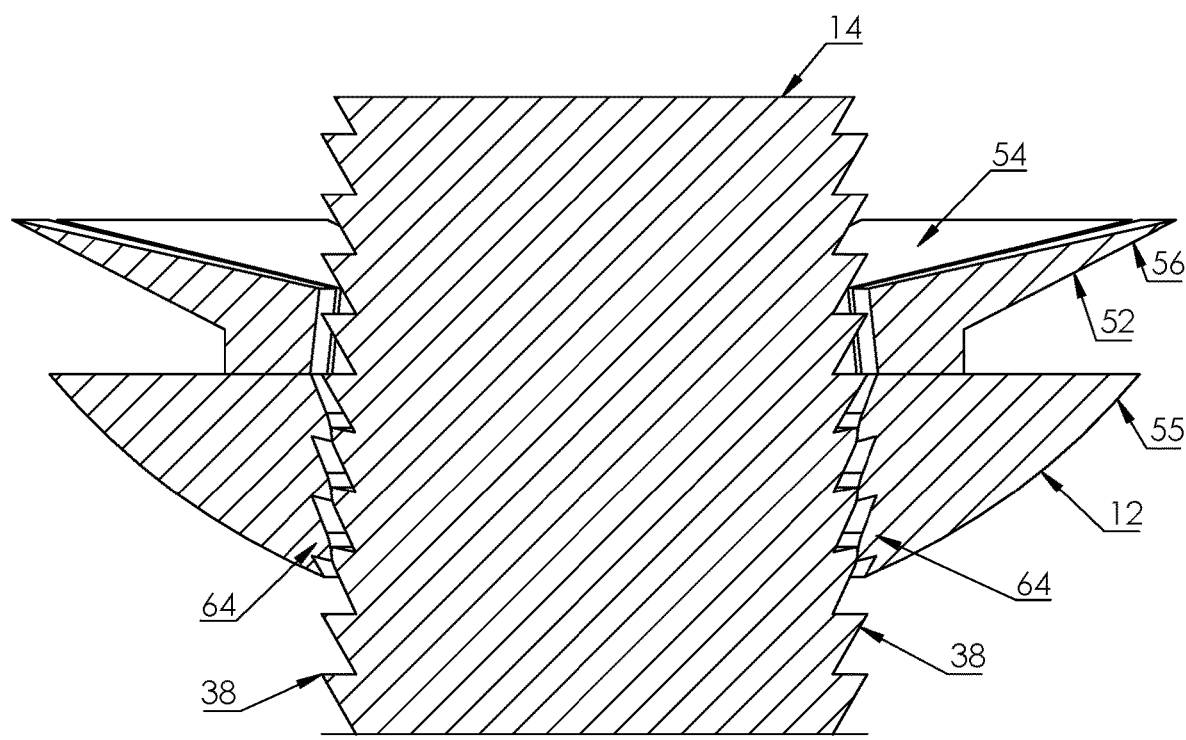
FIG. 17 is a sectional view of a fastener in a non-engaged configuration according to the present invention.

With particular reference to FIGS. 16 and 17, each tooth 38 defines a tip 42 and a root 44 with each point on a tooth 38 lying in the same plane perpendicular to the longitudinal axis. For example, all the points comprising the tip 42 of a single tooth 38 lie in a single plane perpendicular to the longitudinal axis. Likewise, all of the points comprising the root 44 of a single tooth 38 lie in a single plane perpendicular to the longitudinal axis. An outer diameter is defined as the tip-to-tip 42-42 distance across the shank 22 of a single tooth 38. An inner diameter is defined as the root-to-root 44-44 distance across the shank 22 of a single tooth 38. The outer diameter is larger than the inner diameter. The height of a tooth 38 is defined as the outer diameter minus the inner diameter divided by two. The height is approximately 0.25-1.00 millimeters in length. Each tooth 38 has a load-bearing face or step 46 and a ramped face 48 interconnected at a tip 42 or root 44. The load-bearing face 36 has a much steeper slope relative to the ramped face 48 which has a more moderate slope. The load-bearing face 46 is perpendicular to the central longitudinal axis. Both the load-bearing face 46 and the ramped face 48 form a triangular-shaped tooth that extends outwardly from the inner diameter and is formed around the cylindrical surface of the shaft. In cross-section, each tooth 38 forms a scalene triangle in which the two sides of the triangle are of unequal length with the ramped face 48 being longer than the load-bearing face 46. The angle between the load-bearing face 46 and the ramped face 48 is approximately 60 degrees. The root 44 and the tip 42 are, preferably, not truncated or rounded to provide the largest surface contact in order to withstand larger axial forces.

Turning now to FIGS. 8-15, the nut 12 according to the present invention will be discussed. The nut 12 includes a central bore 50 extending between a proximal end and a distal end of the nut 12 along the longitudinal axis. The bore 50 is cylindrical in shape and sized and configured to receive the shank 22 of the bolt 14. The distal end of the nut 12 forms a curved or dome-shaped head 55. Advantageously, the domed surface of the head 55 does not have any socket or outer surface configured for engaging an instrument to drive the nut 12. The proximal end of the nut 12 includes a washer 52. The washer 52 is integrally formed with the nut 12 as a unitary element which advantageously avoids loose and separate parts. The washer 52 includes an upper surface 54 and a lower surface 56 meeting at a tapered outer perimeter. The washer 52 substantially surrounds the central bore 50. In one variation, the upper surface 54 and lower surface 56 are angled upwardly to create a truncated conical upper surface 54. The upper surface 54 of the disc-like washer 52 is slightly conical, concave, angled, curved, cone-shaped, spherical, domed or cupped. Because of the shape of the upper surface 54, the washer 52 is functionable as a spring washer or conical washer which advantageously provides an axial force when deformed under compression. The conical shell of the washer 52 can be loaded in the longitudinal direction and the force transmission is generally concentric. In one variation, the washer 52 of the present invention is provided with a plurality of radial serrations dividing the washer 52 into segments or wings 58. There is an absence of one or more segment/wing 58 in opposite locations on the washer 52 forming openings 60 between the wings 58 for accessing the bore 50 which will be described in greater detail below. In one variation, the head 55 is elongated and the openings 60 are located along the long sides of the head 55 as can be seen in FIGS. 10-11. The washer 52 including one or more of the wings 58 either together or independently are configured to flex, deflect, bend, deform downwardly towards the head 50 and provide a spring force in the opposite axial direction against a fastened object to improve the locking capabilities of the fastener against the object. Unless plastically deformed, the washer 52 will return to its original undeflected configuration. The individual wings 58 can flex independently and, thereby, the upper surface 54 can more closely conform to a non-smooth, irregular surface of a fastened object. The washer 50 is substantially the same as the washer 26 on the bolt 14. The head 55 includes oppositely disposed, angled chamfers 62 in the location of the openings 60 to improve accessibility to the bore 50 via the openings 60.

The internal surface of the bore 50 of the nut 12 is provided with a plurality of ridges 64 formed along the length of the bore 50. The ridges 64 are sized and configured to conform and mate with the teeth 38 formed on the shank 22 in an interlocking manner. Each ridge 64 is formed circumferentially around the bore 50 at a constant distance along the longitudinal axis of the nut 12. The bore 50 is not threaded as there is no helical shape formed by the ridges 38. As previously mentioned, since there are no helical threads formed inside the nut 12, the lead is zero, that is, a revolution of the nut 12 of the present invention with respect to the bolt 14 around the longitudinal axis does not translate the nut 12 along the longitudinal axis. As such, each ridge 64 is a separate circular, annular, non-helical groove, step or ring interconnected with itself around the inside surface of the bore 50. A plurality of equally spaced grooves or steps is formed along the length of the bore 50 with each groove lying in separate parallel planes all of which are perpendicular and concentric to the longitudinal axis wherein the distance between adjacent parallel planes is called the pitch in the present invention. There are approximately 20-60 teeth per inch along the longitudinal axis. The length of the nut 12 and the number of ridges 64 is configured to provide sufficient locking strength to the nut 12. A greater number of ridges 64 on a nut 12 will provide greater locking strength between the nut and the bolt and the nut will be able to withstand larger axial loads. Also, a greater number of ridges along a correspondingly longer nut, will require greater force to move the nut along the bolt. Hence, the number of ridges in the nut and the corresponding length of the nut is selected for a given application as needed to withstand the required amount of axial load in the distal direction to lock the nut with the nut still being movable on the bolt in the proximal direction without undue force. In one variation, there are approximately 4-6 ridges 64 in a nut 12. In another variation, there are at least 4 ridges 64. In another variation, there are 4-10 ridges and, in another variation, there are at least 3 ridges.

Figure 13:
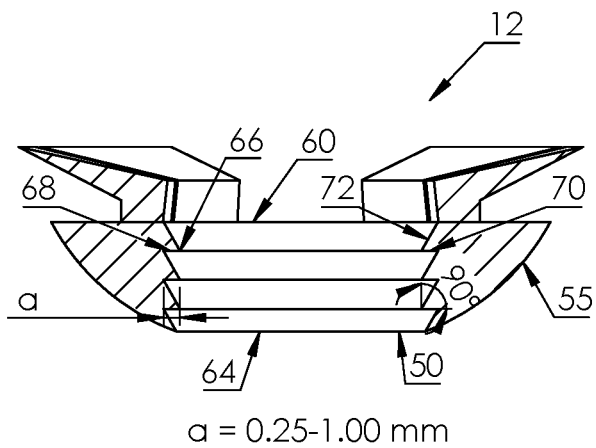
FIG. 13 is a cross-sectional view taken along line 13-13 of FIG. 12 of a nut according to the present invention.
Figure 14:
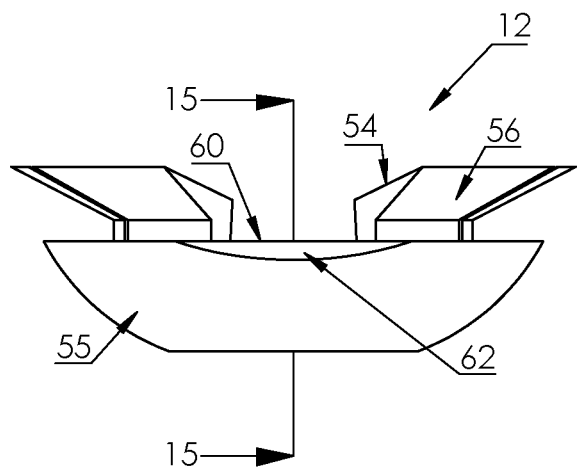
FIG. 14 is a side elevational view of a nut according to the present invention.
Figure 15:
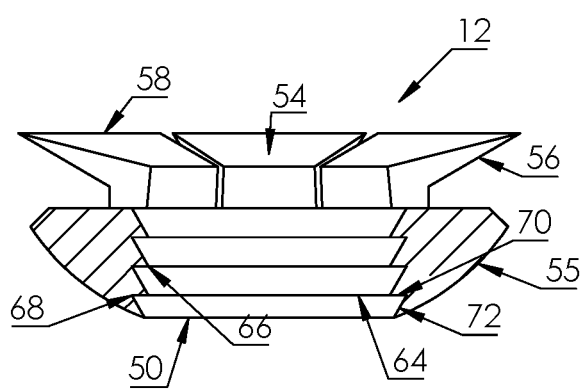
FIG. 15 is a cross-sectional view taken along line 15-15 of FIG. 14 of a nut according to the present invention.

With particular reference to FIGS. 13 and 15, each ridge 64 defines a tip 66 and a root 68 with each point on a ridge 64 lying in the same plane that is perpendicular to the longitudinal axis. For example, all the points comprising the tip 66 of a single ridge 64 lie in a single plane perpendicular to the longitudinal axis. Likewise, all of the points comprising the root 68 of a single ridge 64 lie in a single plane perpendicular to the longitudinal axis. An outer diameter of the bore 50 is defined as the root-to-root 68-68 distance across the bore 50 of a single ridge 64. An inner diameter of the bore 50 is defined as the tip-to-tip 66-66 distance across the bore 50 of a single ridge 64. The outer diameter of the bore 50 is larger than the inner diameter. The height of a ridge 64 is defined as the outer diameter minus the inner diameter divided by two. The height is approximately 0.25-1.00 millimeters in length. Each ridge 64 has a load-bearing face 70 and a ramped face 72 interconnected at a tip 66 or root 68. The load-bearing face 70 has a much steeper slope relative to the ramped face 72 which has a more moderate slope. The load-bearing face 70 is perpendicular to the central longitudinal axis. Both the load-bearing face 70 and the ramped face 72 form a triangle-shaped ridge 64 that extends outwardly from the outer diameter of the bore 50 and toward the central longitudinal axis and is formed around the cylindrical surface of the bore 50. In cross-section, each ridge 64 forms a scalene triangle in which the two sides of the triangle are of unequal length. The angle between the load-bearing face 70 and the ramped face 72 is approximately 60 degrees. The root 68 and the tip 66 are, preferably, not truncated or rounded to provide the largest surface contact possible for withstanding larger axial forces. The bore 50 is provided with an equal number of ridges 64 per inch as is provided on the bolt 14 and the triangular shape of the ridges 64 are the same as the triangular shape of the teeth 38.

The bolt 14 is sized and configured to fit inside the bore 50 of the nut 12 with interference between the circumferential teeth 38 on the bolt 14 and the circumferential ridges 64 on the surface of the bore 50 of the nut 12. As such, the inner diameter of the bore 50 is larger than the inner diameter of the shank 22. Also, the inner diameter of the bore is smaller than the outer diameter of shank 22. The outer diameter of the bore 50 is larger than the outer diameter of the shank 22. The interference between the ridges 64 on the bore 50 and the teeth 38 on the shank 22 is configured such that the ridges 64 interlock with the teeth 38 to fix the longitudinal position of the nut 12 relative to the bolt 14 with respect to translation of the nut 12 in the distal direction.

Figure 7A:
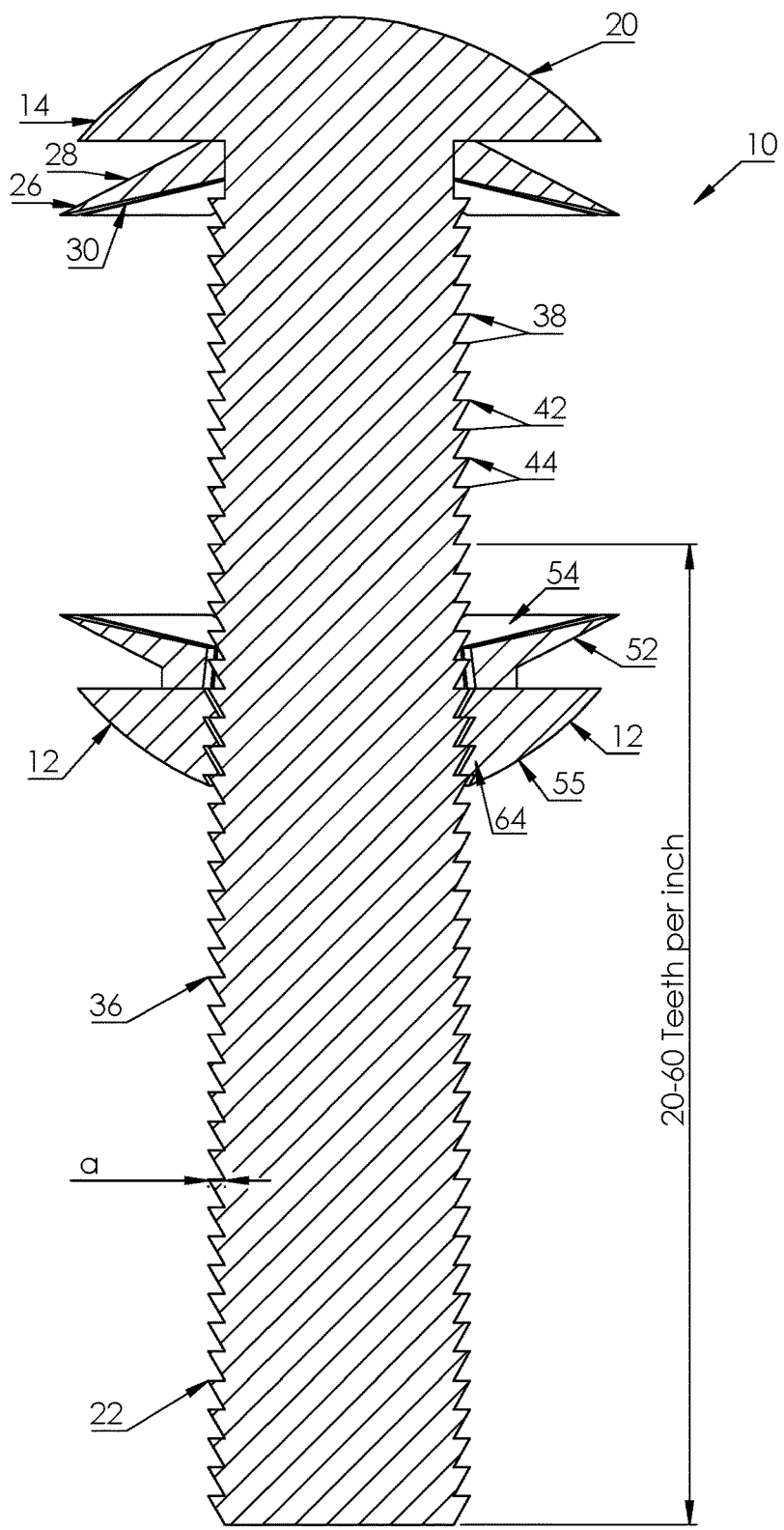
FIG. 7A is cross-sectional view taken along line 7A-7A of FIG. 5 of a fastener according to the present invention.
Figure 7B:
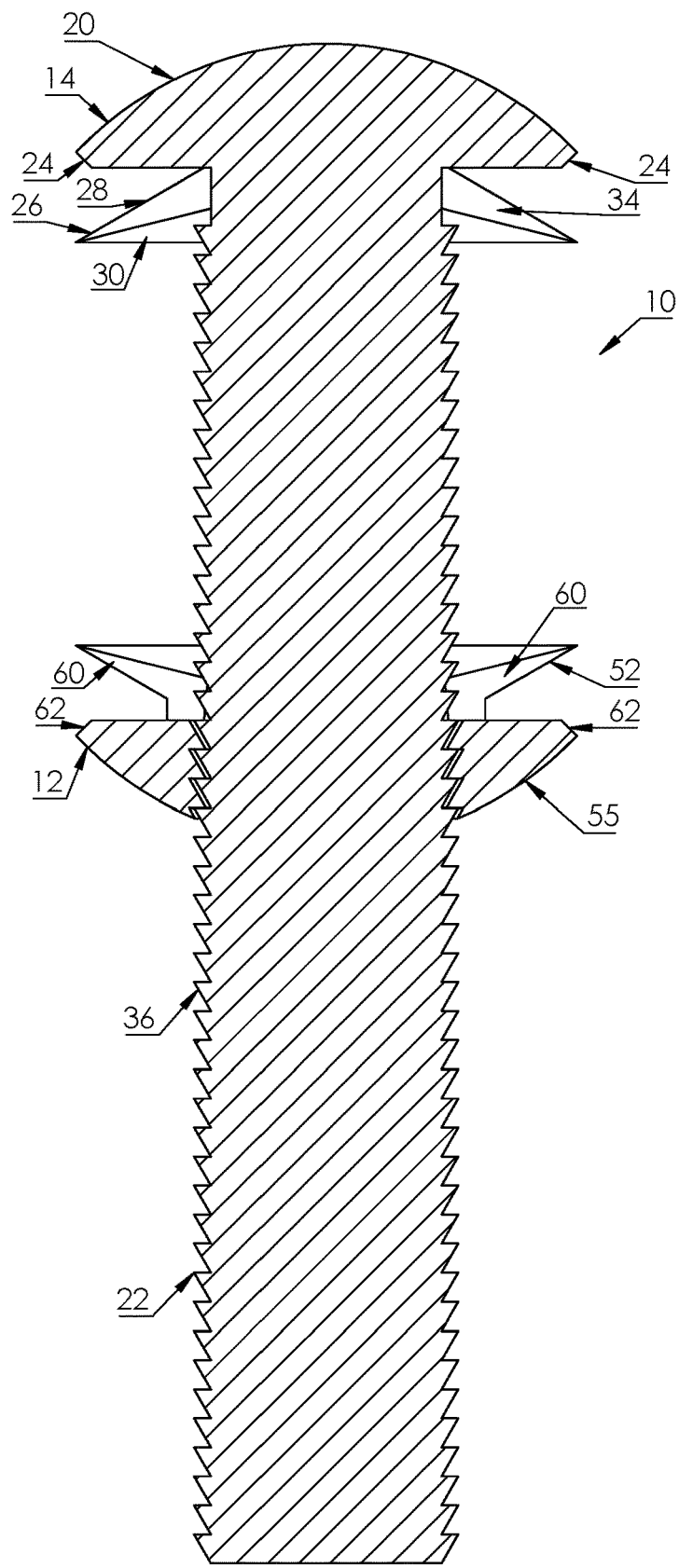
FIG. 7B is a cross-sectional view taken along line 7B-7B of FIG. 5 of a fastener according to the present invention.
Figure 12:
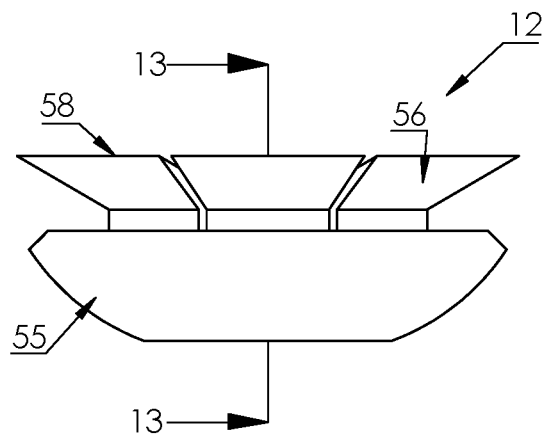
FIG. 12 is a side elevational view of a nut according to the present invention.

The fastener system 10 according to the present invention defines an engaged configuration depicted in FIGS. 7A-7B and 16 in which the teeth 38 are interlocked with the ridges 64. In particular, the load-bearing face 46 of the teeth 38 abut, contact, face, and are substantially parallel to the load-bearing face 70 of the ridges 64 and translation of the nut 12 relative to bolt 14 in a distal direction away from the head 20 of the bolt 14 is arrested. In this engaged configuration, one or more of the ridges 64 of the nut 12 are engaged/interlocked with an equal number of teeth 38 on the bolt 14. If the entire nut 12 is located proximal to the distal end 18 of the bolt 14, all of the ridges 64 are interlocked, engaged with an equal number of teeth 38 on the bolt 14. When in the engaged configuration, movement of the nut 12 relative to the bolt 14 in a distal direction is prevented by the abutment of the load-bearing faces 46, 76; however, translation of the nut 12 relative to the bolt 14 in a proximal direction toward the head 20 is permitted as the ramped surfaces 48, 72 are permitted to slide relative to each other due to their moderate slope, angle. Hence, the fastener 10 of the present invention is a unidirectional fastener, permitting translation of the nut 12 relative to the bolt 14 in only one direction, that being in the proximal direction toward the head 20 of the bolt 14 in order to reduce the distance between the nut 12 and the head 20 of the bolt 14 and fasten against an object captured therebetween. The unidirectional fastener of the present invention does not permit translation of the nut 12 relative to the bolt 14 distally toward the distal end 18 of the bolt 14.

The fastener system 10 according to the present invention defines a non-engaged configuration depicted in FIG. 17 in which the teeth 38 are not interlocked with the ridges 64. In particular, when the nut 14 is translating with the shank 22 inside the bore 50, the ramped surface 72 of each ridge 64 will slide against the ramped surface 48 of each tooth 38 forcing the ridges 64 and teeth 38 to deflect against each other. Such deflection takes place close to the tips 42, 66 where the material comprising the teeth 38 and ridges 64 is thinner and more flexible. FIG. 17 depicts the non-engaged configuration in which the teeth 38 and ridges 64 are oppositely deflected. When the tips 66 of the ridges 64 substantially simultaneously ramp over the tips 42 of the teeth 38 the deflected tips 42, 66 will simultaneously spring back toward their original undeflected configuration and snap into position of the engaged configuration. The nut 12 may continue to be moved proximally but is not permitted to be moved in a distal direction. Because of the moderate slope of the ramped surfaces 48, 72, there is less friction between the nut 12 and bolt 14 with movement in the proximal direction. When moving in an unrestricted direction, i.e. proximally toward the head 20 of the bolt 14, the nut 12 easily slides along the shank 22 with an audible click when the ridges 64 snap into position between teeth 38. When the nut 12 is attempted to be moved in the distal direction away from the head 20 of the bolt 14, the load-bearing surfaces 46,70 will abut and the ridges 64 will lock against the teeth 38 preventing any further motion in that direction. Relative rotational movement of the nut 12 around the bolt 14 does not result in translation of the nut 12 in along the longitudinal axis. There is little rotational friction and the nut may freely rotate around the bolt without affecting the fixed relationship in the longitudinal direction.

In use, the bolt 14 is passed through one or more target objects to be fastened together. The bolt 14 is inserted into the bore 50 of the nut 12 in the proper orientation with the washer 52 facing the target objects. The nut 12 is moved toward the head 20 of the bolt 14 and the barb-like circumferential teeth 38 are deflected simultaneously with engagement of the barb-like ridges 68 as the ramped surfaces 48, 72 slide against each. The teeth 38 are deflected proximally with proximal movement of the nut 12 relative to the bolt 14 and the ridges 64 are deflected distally. After the ridges 64 clear the teeth 38, the ridges 64 enter into complementary engagement wherein the ridges 64 are located between adjacent teeth 38 and the load-bearing surfaces 46, 70 and ramped surfaces 48, 72 facing each other. The teeth 38 and ridges 64 both elastically deform. In one variation, only the teeth 38 elastically deform and the ridges 64 are not elastically deformed and merely ride over the teeth 38. In another variation, only the ridges 64 elastically deform and the teeth 38 are not elastically deformed. In yet another variation, both the teeth 38 and ridges 64 do not elastically deform. Movement of the nut 12 toward the distal end of the bolt 14 is arrested as the load-bearing surfaces 46, 70 abut; however, continued proximal movement of the nut 12 relative to the bolt 14 is permitted to continue until the washer 26 on the bolt 14 and the washer 52 on the nut 12 contact the target objects therebetween. With continued movement of the nut 12 towards the proximal end, both washers 26, 52 will begin to deflect causing the conical-shaped washers to flatten against the surface of the target objects. The segments 32, 58 will flex independently of each other and conform against an irregular surface. With continued compression of the washers, a spring force in the opposite axial direction will be exerted forcing the head 55 of the nut 12 distally and increasing the friction against the load-bearing surfaces 46, 70 locking the nut 12 tightly to the bolt 14 and against the target objects. The bolt and nut washers 26, 52 tension the fastener by applying simultaneously opposing forces. Movement of the nut 14 toward the distal end 18 is prevented and the locked nut cannot be released and the space between the nut 14 and the head 20 cannot be increased. Only unidirectional translation of the nut 14 relative to the bolt 12 is possible.

If it is desired to remove the fastener or unlock the nut from the bolt, it is necessary to cut or break the bolt or nut. The fastener 10 can be made from any suitable material including metal or plastic or a combination of metal and plastic such as the nut being made of plastic and the bolt made of metal or vice versa. Preferably, the fastener 10 is made of plastic or other polymer such as polypropylene or nylon or other frangible material that lends itself to be cut or destroyed. The fastener 10 can be a single use fastener or a reusable fastener. The fastener of the present invention continues to function even when the ridges or teeth have been worn down. In one variation, the bolt is manufactured without a head to permit removal of the fastener without cutting it. The fastener 10 can be manufactured in any number of ways known in the art including injection molding enabling them to be less costly than conventional metal fasteners and lighter weight. Weight-to-strength ratios are crucial in many fastener applications.

A suitable cutting instrument such as nipper dikes can be employed to release the fastener 10. The cutting jaws of the instrument are aligned with the oppositely disposed chamfers 24 on the bolt head 20 and the oppositely disposed openings 34 formed in the washer 26. The openings 34 advantageously expose the shaft of the bolt 14 to be cut and provide a location unobstructed by the domed head 20, or washer 26 as well as a location where there is less thickness of material to facilitate cutting of the shank 22. The chamfers 24 assist in leading an instrument into position. After the cutting instrument is activated, the large diameter head and washer 26 is removed from the shank 22. The washer 26 is configured such that the individual segments 32 are easily removed when a cut is made at the oppositely disposed openings 34. With the washer 26 and head 20 removed, the target objects can be removed and/or the nut 12 moved in the proximal direction toward the cut location and off the shank 22. Alternatively, or in conjunction with cutting the proximal end of the bolt 14, a cut using the same instrument can be made at the location of the nut 14. In particular, the jaws of the cutting instrument are aligned with the openings 60 at the washer 52 on the nut 12. The instrument is activated and the nut 12 and shank 22 are cut at a location above the ridges 64. The segments 58 of the washer 52 advantageously fall away and the fastener can be freely removed. The fastener 10 of the present invention advantageously cannot be released by twisting or rotating the nut 12 in the opposite direction as in a common nut-and-bolt fastener with helical threads. These conventional nut-and-bolt fasteners are loosened when subjected to continued vibration which is advantageously not possible with fastener of the present invention. Because the fastener 10 can be easily cut, the present invention avoids the need for stocking multiple bolts having different lengths for different applications. The cutting instrument used to release the fastener can also be used to advantageously cut the bolt to length as desired. Cutting a conventional bolt with helical threads to length is difficult as threads can be easily damaged during the process preventing threaded engagement.

Turning now to FIGS. 18-21, another variation of the fastener 10 will be described wherein like reference numbers are used to describe like parts. In the variation of FIGS. 18-21, the fastener 10 is the same as the fastener 10 of FIGS. 1-17 except for the triangular shape of the teeth 38 and ridges 64.

In the variation of FIGS. 18-21, an outer diameter is defined as the tip-to-tip 42-42 distance across the shank 22 of a single tooth 38. An inner diameter is defined as the root-to-root 44-44 distance across the shank 22 of a single tooth 38. The outer diameter is larger than the inner diameter. The height of a tooth 38 is defined as the outer diameter minus the inner diameter divided by two. The height for the variation of FIGS. 18-21 is approximately 0.25-1.00 millimeters in length. The load-bearing face 46 is raked/angled toward the proximal end. Both the load-bearing face 46 and the ramped face 48 form a triangular-shaped tooth that extends outwardly from the inner diameter and is formed around the cylindrical surface of the shaft. In cross-section, each tooth 38 forms a scalene triangle in which the two sides of the triangle are of unequal length with the ramped face 48 being longer than the load-bearing face 46. The angle between the load-bearing face 46 and the ramped face 48 is approximately 30 degrees. In another variation the angle between the load-bearing face 46 and the ramped face 48 is between zero degrees and approximately 60 degrees. In another variation, the angle between the load-bearing face 46 and longitudinal axis is between 0 and 90 degrees. The root 44 and the tip 42 are, preferably, not truncated or rounded to provide the largest surface contact in order to withstand larger axial forces. The smaller angle of 30 degrees between the load-bearing face 46 and the ramped face 48 makes the tip 42 more flexible compared with the variation of FIGS. 1-17. Also, the load-bearing face 46 is slightly longer relative to the load-bearing face 46 of the variation of FIGS. 1-17.

Figure 18:
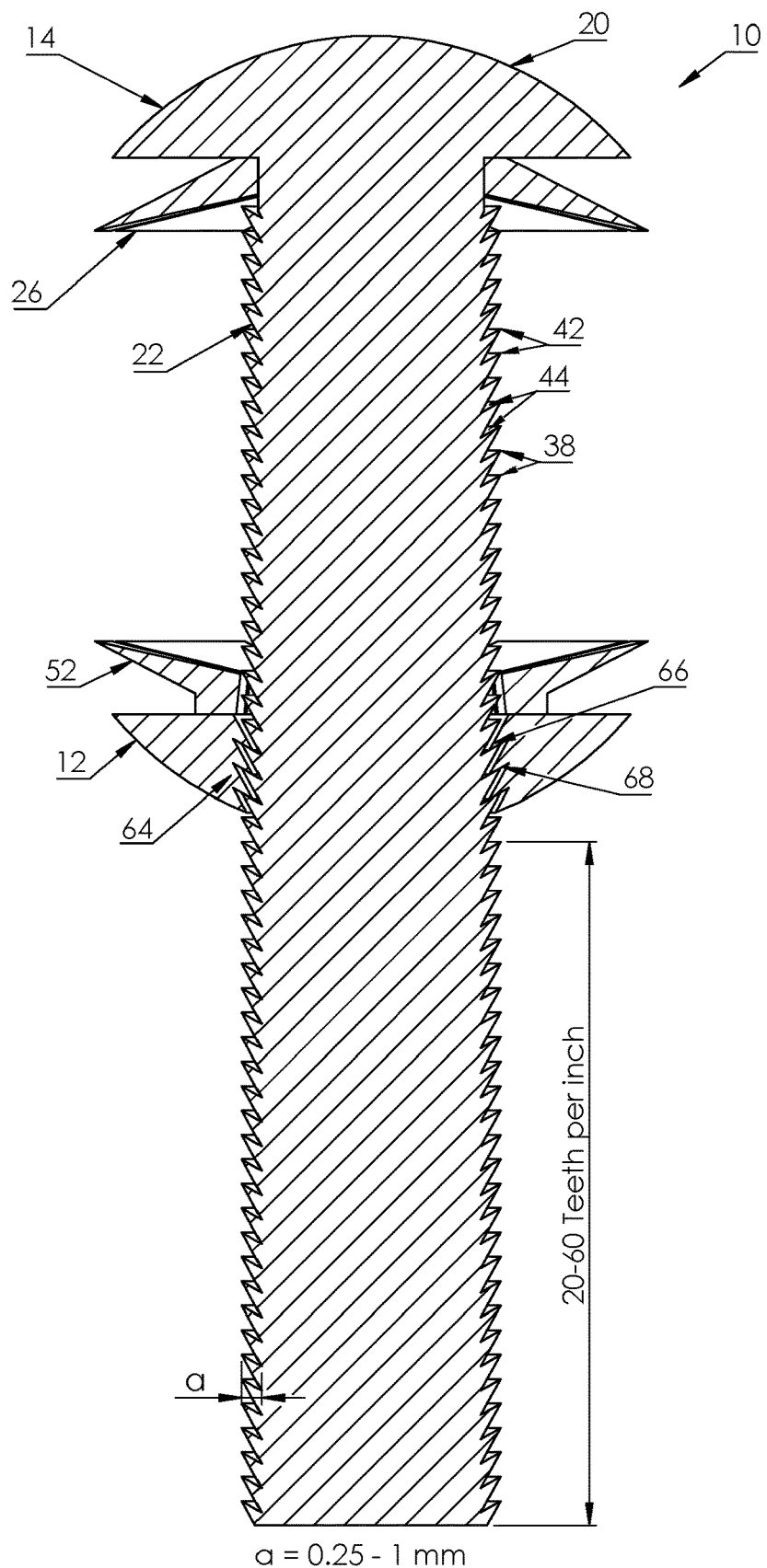
FIG. 18 is a cross-sectional view of a fastener according to the present invention.
Figure 19:
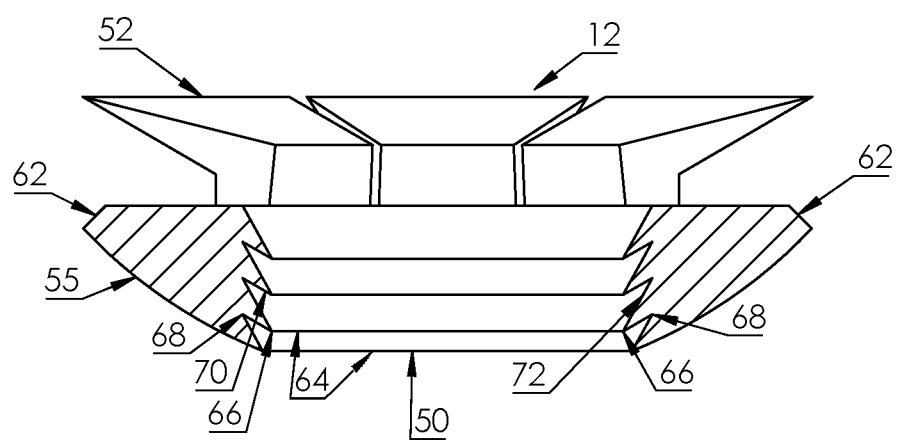
FIG. 19 is a cross-sectional view of a nut according to the present invention

With particular reference to FIG. 19, the nut 12 includes ridges 64 that are sized and configured and complementarily raked/angled to engage and interlock with the teeth 38 of the bolt 14. The outer diameter of the bore 50 is defined as the root-to-root 68-68 distance across the bore 50 of a single ridge 64. An inner diameter of the bore 50 is defined as the tip-to-tip 66-66 distance across the bore 50 of a single ridge 64. The outer diameter of the bore 50 is larger than the inner diameter. The height of a ridge 64 is defined as the outer diameter minus the inner diameter divided by two. The height is approximately 0.25-1.00 millimeters in length for the variation in FIGS. 18-21. Each ridge 64 has a load-bearing face 70 and a ramped face 72 interconnected at a tip 66 or root 68. The load-bearing face 70 has a much steeper slope relative to the ramped face 72 which has a more moderate slope. The load-bearing face 70 is inclined with respect to the central longitudinal axis. Both the load-bearing face 70 and the ramped face 72 form a triangle-shaped ridge 64 that extends outwardly from the outer diameter of the bore 50 and toward the central longitudinal axis and is formed around the cylindrical surface of the bore 50. In cross-section, each ridge 64 forms a scalene triangle in which the two sides of the triangle are of unequal length with the ramped face 72 being longer than the load-bearing face 70. The angle between the load-bearing face 70 and the ramped face 72 is approximately 30 degrees. In another variation the angle between the load-bearing face 70 and the ramped face 72 is between zero degrees and approximately 60 degrees. In another variation, the angle between the load-bearing face 70 and longitudinal axis is between 0 and 90 degrees. The root 68 and the tip 66 are, preferably, not truncated or rounded to provide the largest surface contact possible for withstanding larger axial forces. The bore 50 is provided with an equal number of ridges 64 per inch as is provided on the bolt 14. The smaller angle of 30 degrees between the load-bearing face 70 and the ramped face 72 makes the tip 66 more flexible compared with the variation of FIGS. 1-17. Also, the load-bearing face 70 is slightly longer relative to the load-bearing face 70 of the variation of FIGS. 1-17. The ridges 64 fit between the teeth 38 as shown in FIG. 20 with a small acceptable manufacturing tolerance.

Figure 20:
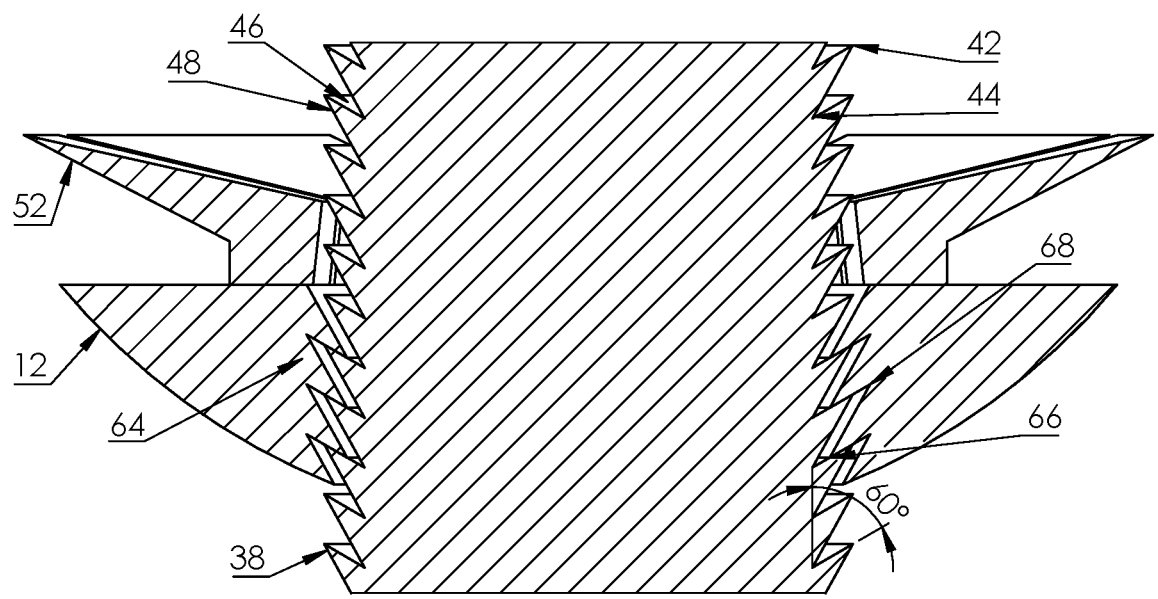
FIG. 20 is a sectional view of a fastener in an engaged configuration according to the present invention.

The engaged or locked configuration depicted is depicted in FIGS. 18 and 20 in which the teeth 38 are interlocked with the ridges 64. In particular, the load-bearing face 46 of the teeth 38 abut, contact, face, and are substantially parallel to the load-bearing face 70 of the ridges 64 and translation of the nut 12 relative to bolt 14 in a distal direction away from the head 20 of the bolt 14 is arrested. In this engaged configuration, one or more of the ridges 64 of the nut 12 are engaged/interlocked with an equal number of teeth 38 on the bolt 14. If the entire nut 12 is located proximal to the distal end 18 of the bolt 14, all of the ridges 64 are interlocked, engaged with an equal number of teeth 38 on the bolt 14. When in the engage configuration, movement of the nut 12 relative to the bolt 14 in a distal direction is prevented by the abutment of the load-bearing faces 46, 76; however, translation of the nut 12 relative to the bolt 14 is a proximal direction toward the head 20 is permitted as the ramped surfaces 48, 72 are permitted to slide relative to each other due to their moderate slope, angle. Hence, the fastener 10 of the present invention is a unidirectional fastener, permitting translation of the nut 12 relative to the bolt 14 in only one direction, that being in the proximal direction toward the head 20 of the bolt 14 in order to reduce the distance between the nut 12 and the head 20 of the bolt 14, capturing therebetween the objects targeted for fastening. The unidirectional fastener of the present invention does not permit movement of the nut 12 relative to the bolt 14 distally toward the distal end 18 of the bolt 14.

Figure 21:
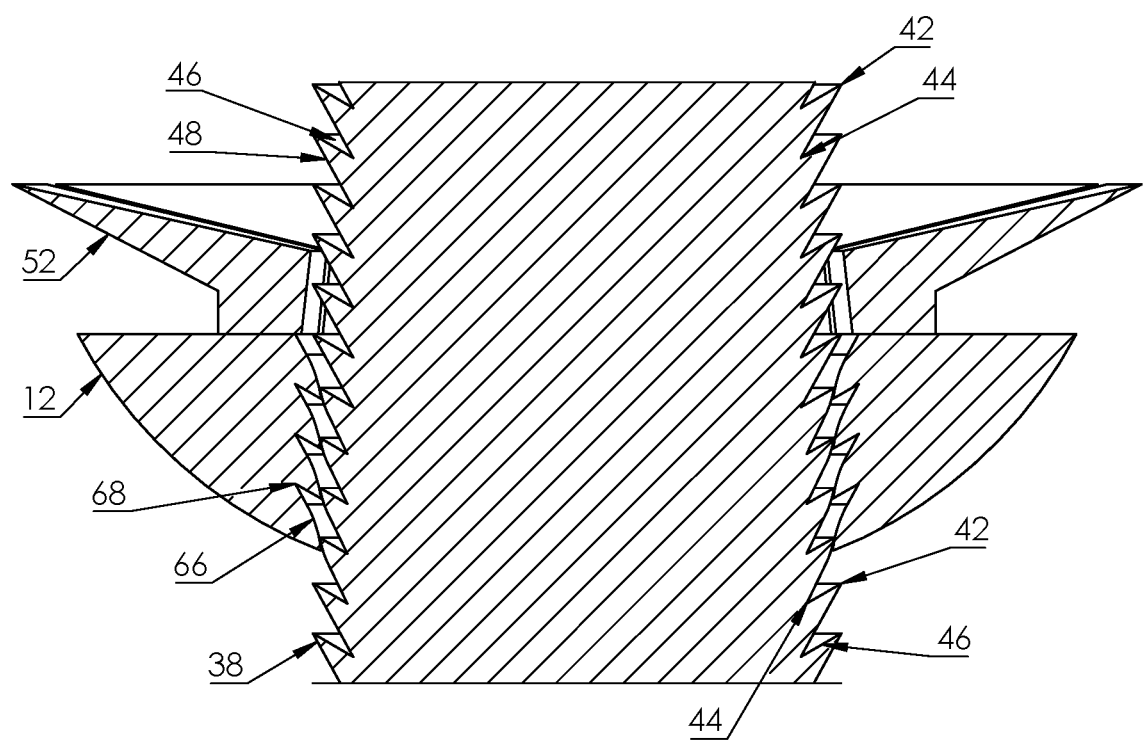
FIG. 21 is a sectional view of a fastener in a non-engaged configuration according to the present invention.

The non-engaged configuration is depicted in FIG. 21 in which the teeth 38 are not interlocked with the ridges 64. In particular, when the nut 14 is translating with the shank 22 inside the bore 50, the ramped surface 72 of each ridge 64 will slide against the ramped surface 48 of each tooth 38 forcing the ridges 64 and teeth 38 to deflect against each other. Such deflection takes place close to the tips 42, 66 where the material comprising the teeth 38 and ridges 64 is thinner and more flexible. FIG. 21 depicts the non-engaged configuration in which the teeth 38 and ridges 64 are deflected. When the tips 66 of the ridges 64 simultaneously ramp over the tips 42 of the teeth 38 the deflected tips 42, 66 will simultaneously spring back toward their original undeflected configuration and snap into position of the engaged configuration. The nut 12 may continue to be translated proximally but is not permitted to translate in a distal direction. Because of the moderate slope of the ramped surfaces 48, 72, there is less friction between the nut 12 and bolt 14 with movement in the proximal direction. When moving in an unrestricted direction, i.e. proximally toward the head 20 of the bolt 14, the nut 12 easily slides along the shank 22 with an audible click when the ridges 64 snap into position between the teeth 38. When the nut 12 is attempted to be moved in the distal direction away from the head 20 of the bolt 14, the load-bearing surfaces 46,70 will abut and the ridges 64 will lock against the teeth 38 preventing any further motion in that direction. Relative rotational movement of the nut 12 around the bolt 14 does not result in translation of the nut 12 along the longitudinal axis. There is little rotational friction and the nut may freely rotate around the bolt without affecting the fixed relationship in the longitudinal direction.

Turning now to FIGS. 22-28, another variation of the fastener 10 will be described wherein like reference numbers are used to describe like parts. In the variation of FIGS. 22-28, the fastener 10 is the same as the fastener 10 of FIGS. 1-17 except for the arrangement and configuration of teeth 38 on the bolt 14 and ridges 64 on the nut 12. The head 20 and washer 26 of the bolt 14 as well as the head 55 and washer 52 of the nut 12 are the same as in FIGS. 1-17. Therefore, the arrangement of teeth 38 and the ridges 64 will be described for this variation.

Figure 22:
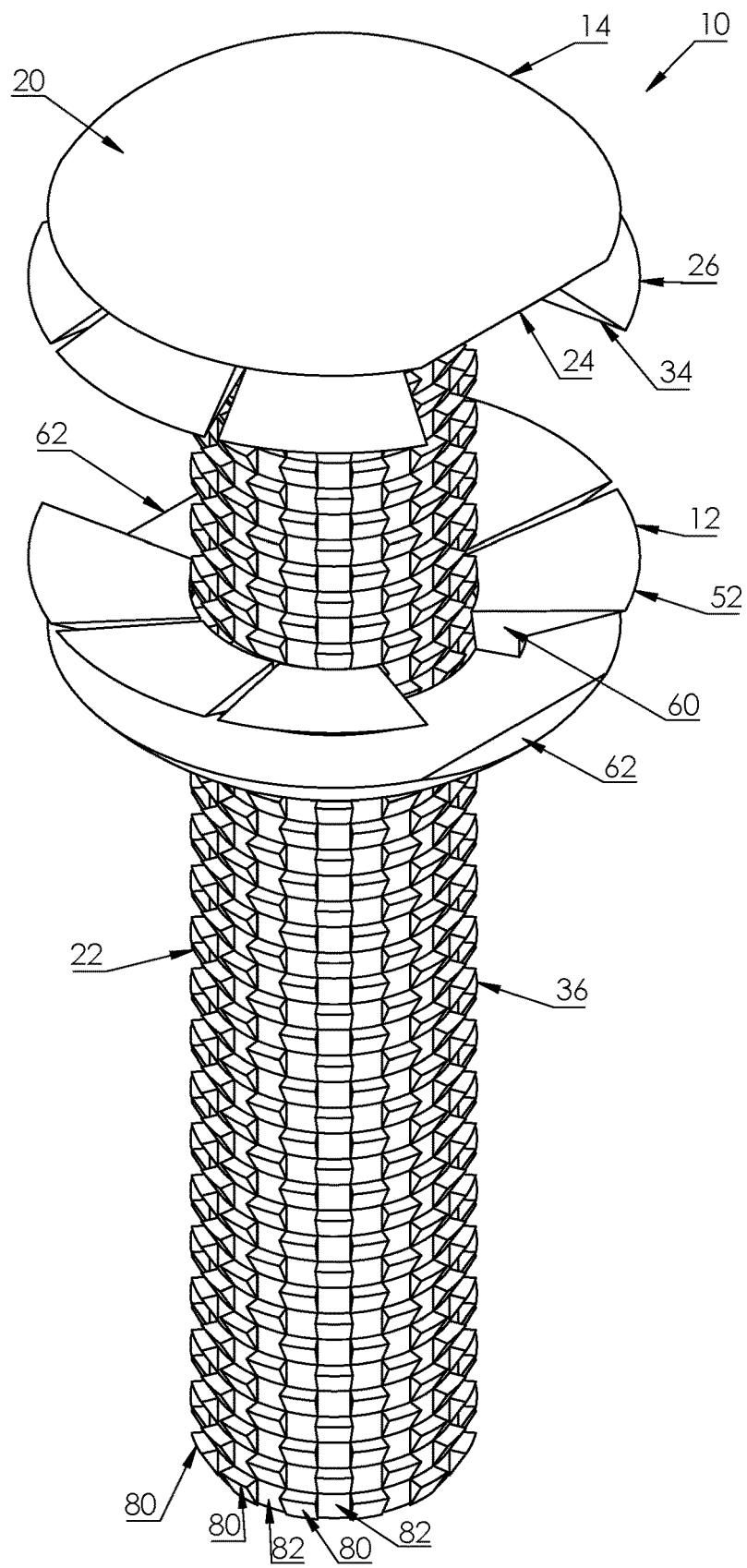
FIG. 22 is a top perspective view of a fastener according to the present invention.
Figure 23:
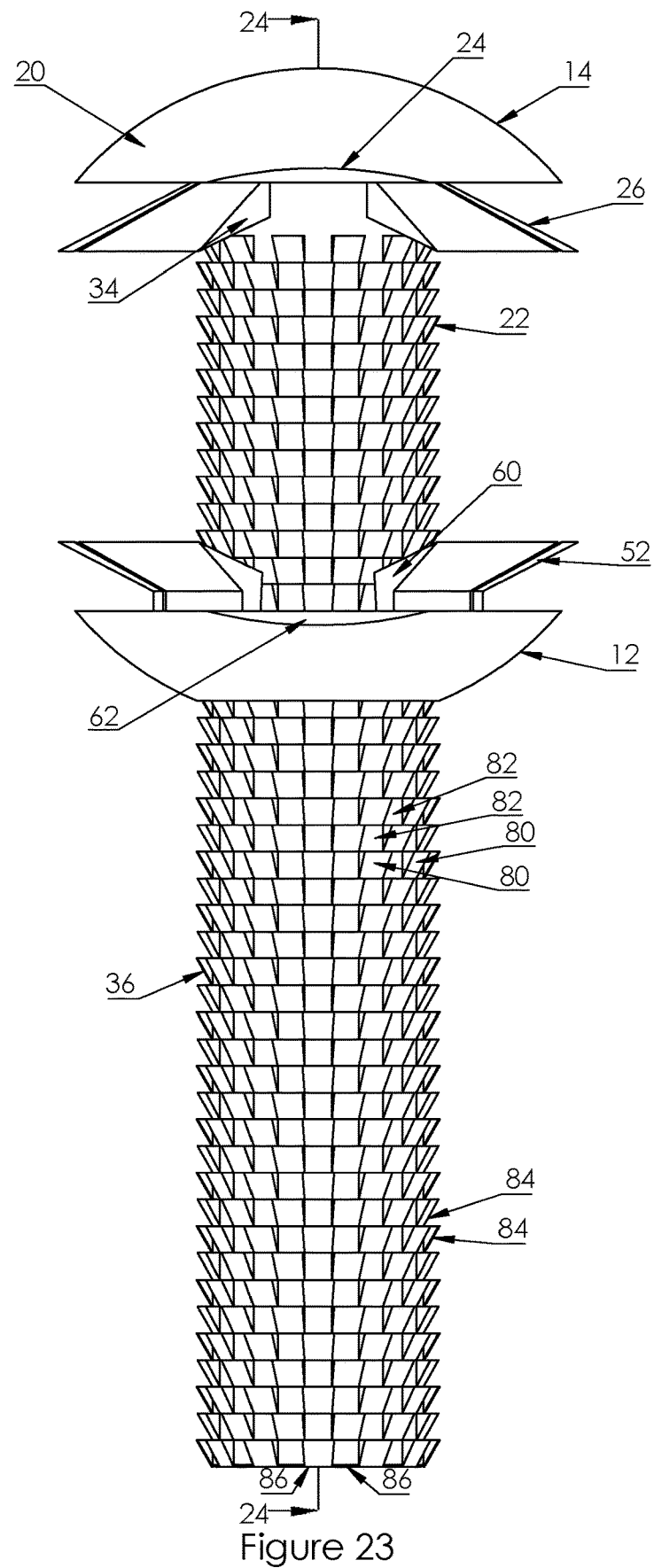
FIG. 23 is a side-elevational of a fastener according to the present invention.

With particular reference to FIGS. 22 and 23 the toothed portion 36 of the shaft 22 is provided with a plurality of individual, wedge-like teeth 38 arranged evenly in rows 84 and columns 86 forming toothed segments 80 around the cylindrical shank 22 and extending outwardly from the inner diameter. The toothed segments 80 are interspersed with blank segments 82 without teeth 38 in a checkerboard-like fashion wherein in any given circumferential row 84 or longitudinal column 86, toothed segments 80 alternate with blank segments 82. The segments 80, 82 are of equal shape and size. The segments 80, 82 are square in one variation and rectangular in another variation. In one variation, there are 24 segments in each circumferential row 84 comprising twelve toothed segments 80 located alternatingly between twelve blank segments 82. Each toothed segment 80 is an arc of approximately 15 degrees. There are approximately 20-60 rows of teeth 38 per inch along the longitudinal axis.

In the variation of FIGS. 22-28, an outer diameter is defined as the tip-to-tip 42-42 distance across the shank 22 of a single tooth 38. An inner diameter is defined as the root-to-root 44-44 distance across the shank 22 of a single tooth 38. The outer diameter is larger than the inner diameter. The height of a tooth 38 is defined as the outer diameter minus the inner diameter divided by two. The height for the variation of FIGS. 22-28 is approximately 0.25-1.00 millimeters in length. The load-bearing face 46 is perpendicular to the longitudinal axis. Both the load-bearing face 46 and the ramped face 48 form a triangle-shaped tooth that extends outwardly from the inner diameter and is formed around the cylindrical surface of the shaft. In cross-section, each tooth 38 forms a scalene triangle in which the two sides of the triangle are of unequal length with the ramped face 48 being longer than the load-bearing face 46. The angle between the load-bearing face 46 and the ramped face 48 is approximately 60 degrees. In another variation the angle between the load-bearing face 46 and the ramped face 48 is between zero degrees and approximately 60 degrees. In another variation, the angle between the load-bearing face 46 and longitudinal axis is between 0 and 90 degrees.

Figure 24:
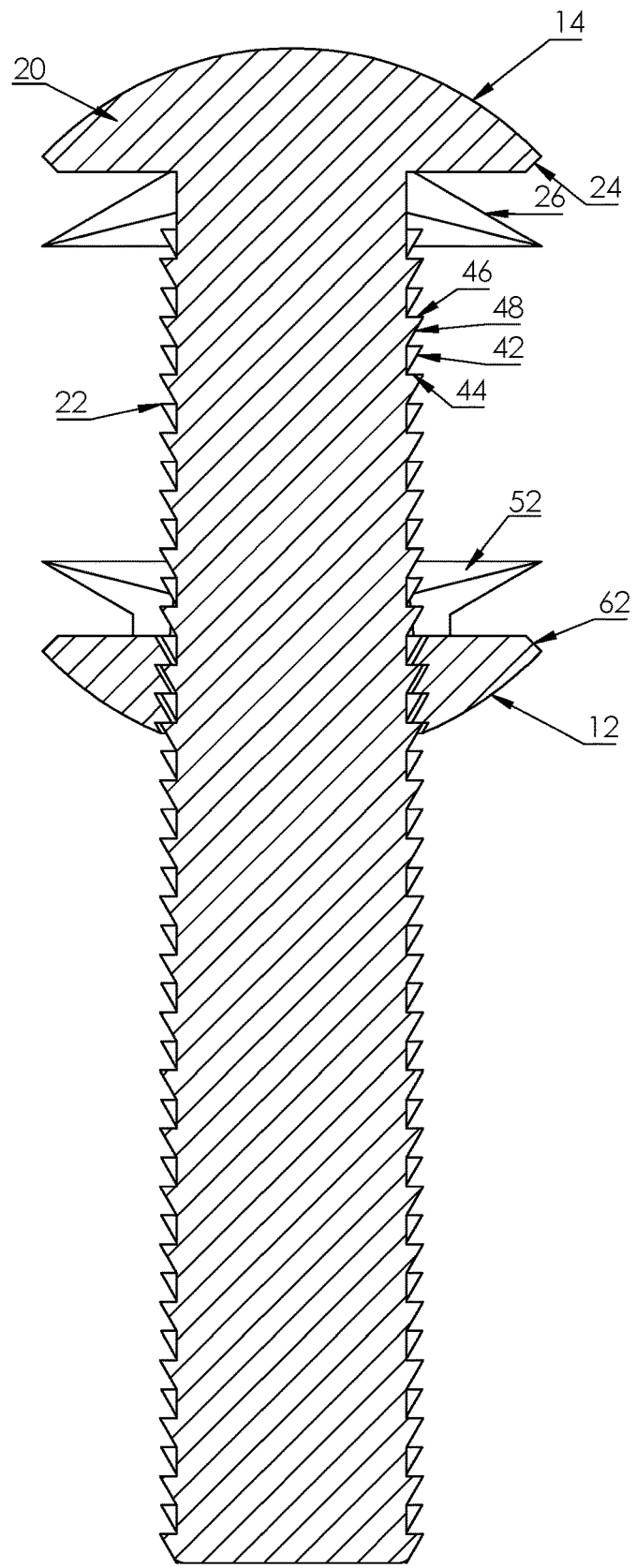
FIG. 24 is a cross-sectional view taken along line 24-24 of FIG. 23 of a fastener according to the present invention.
Figure 25A:
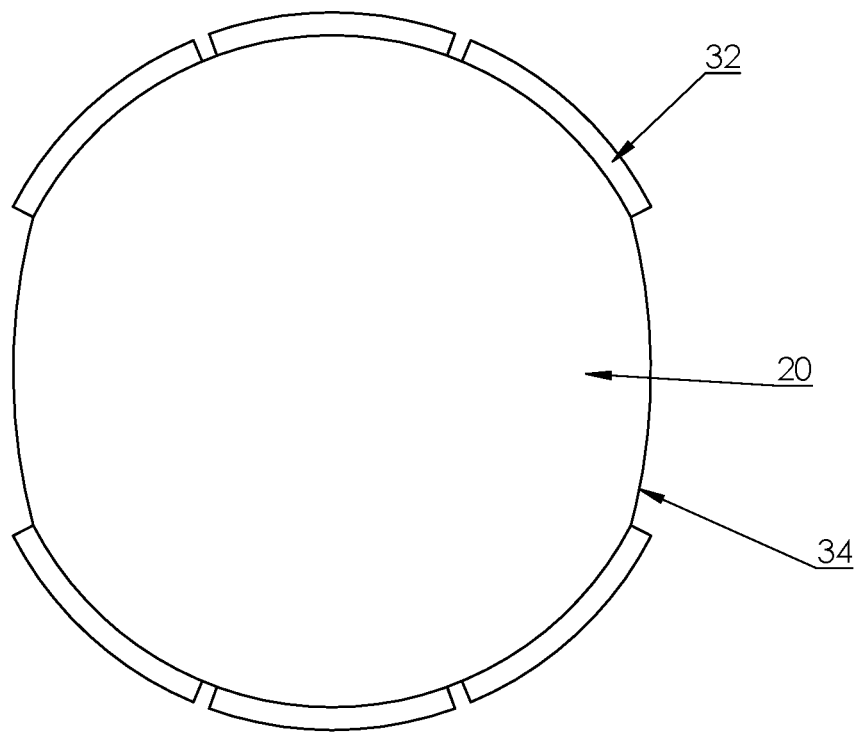
FIG. 25A is a top view of a fastener according to the present invention.
Figure 25B:
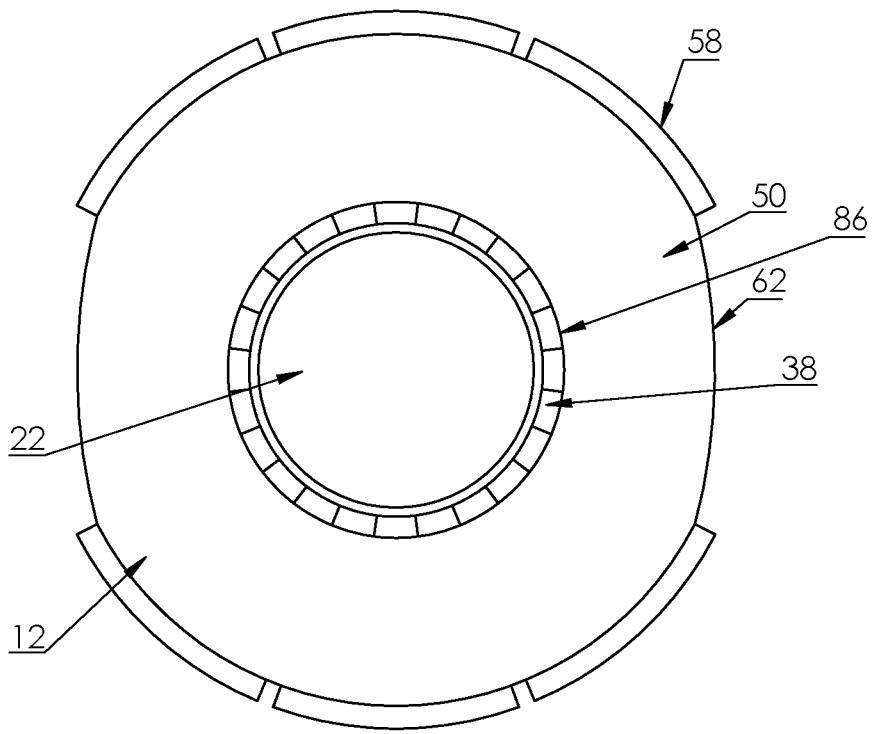
FIG. 25B is a bottom view of a fastener according to the present invention.
Figure 26:
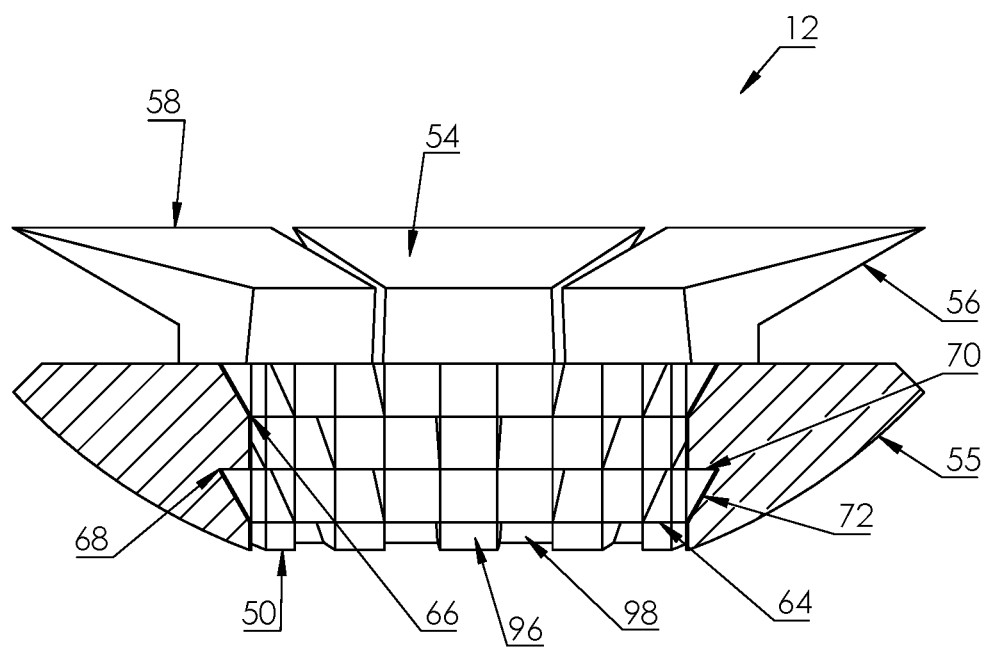
FIG. 26 is a cross-sectional view of a fastener according to the present invention.
Figure 27:
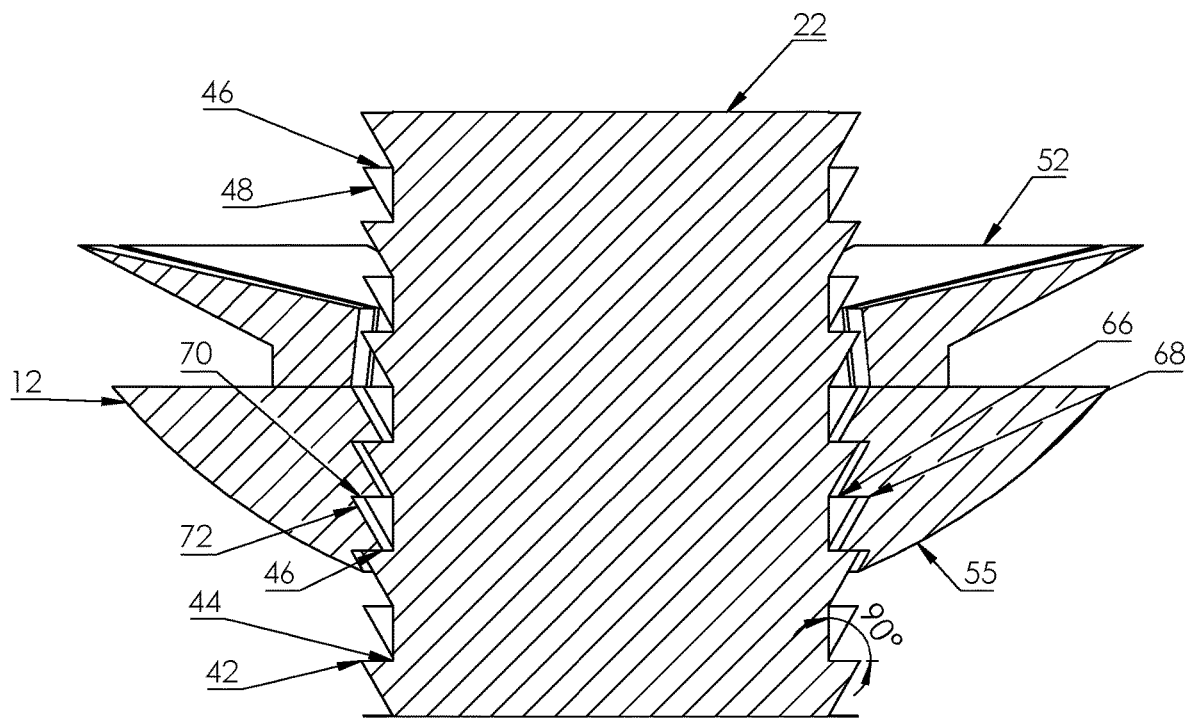
FIG. 27 is a cross-sectional view of a fastener in an engaged configuration according to the present invention.
Figure 28:
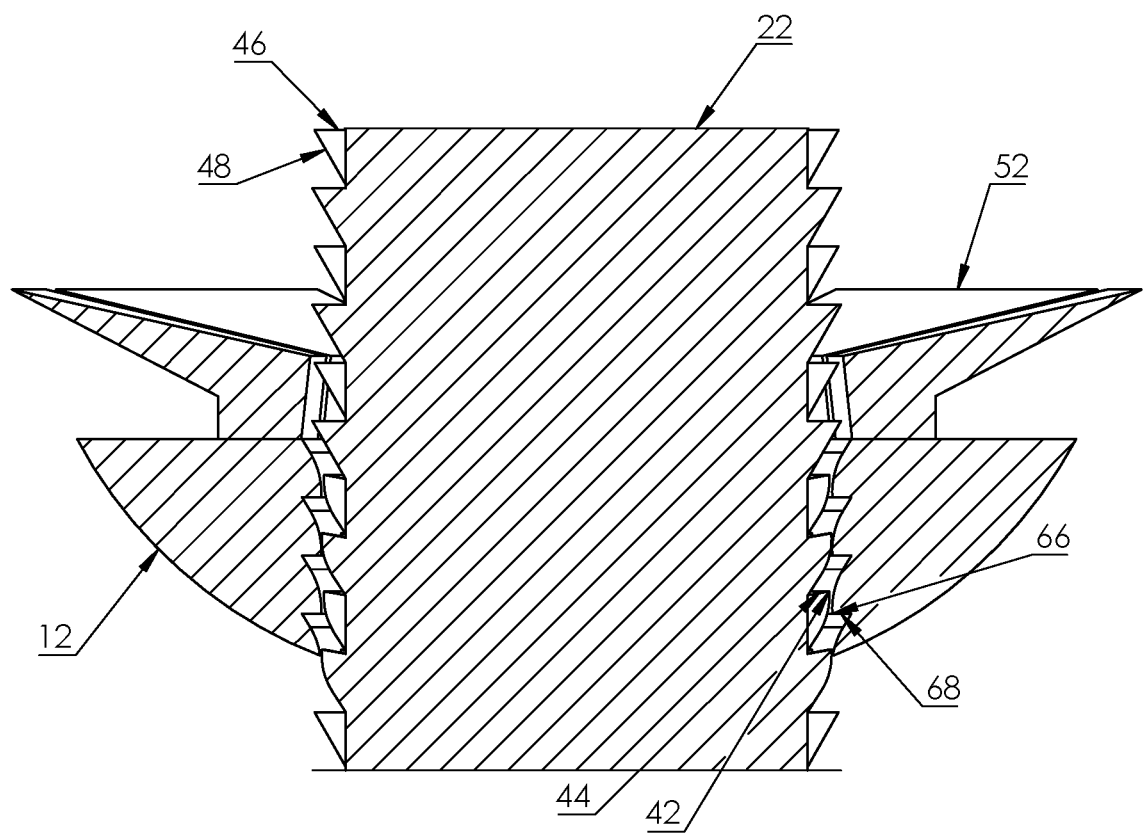
FIG. 28 is a cross-sectional view of a fastener in a non-engaged configuration according to the present invention.
Figure 29:
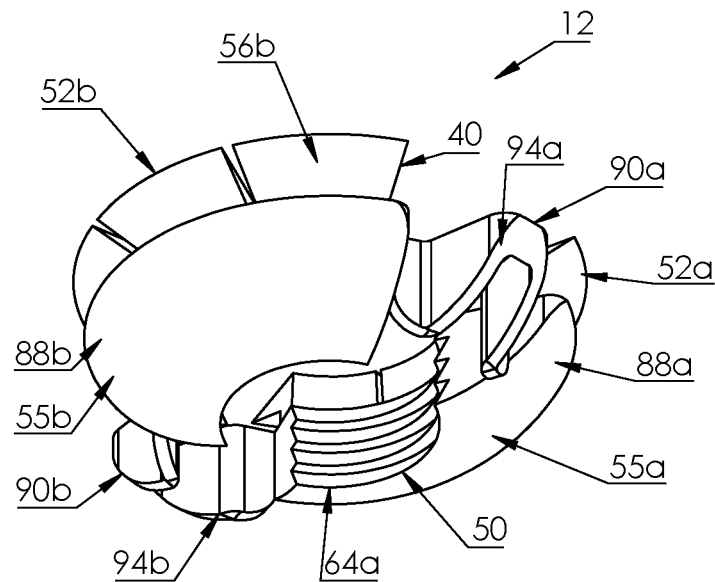
FIG. 29 is a bottom perspective view of an expandable nut according to the present invention.
Figure 30:
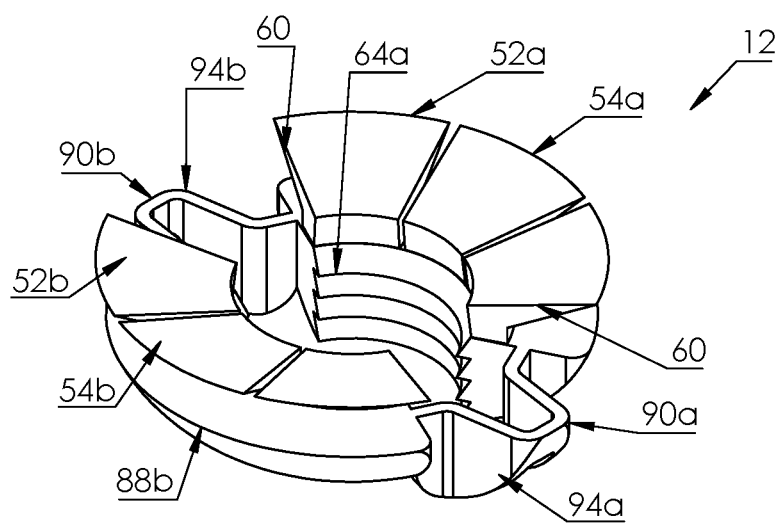
FIG. 30 is a top perspective view of an expandable nut according to the present invention.
Figure 31:
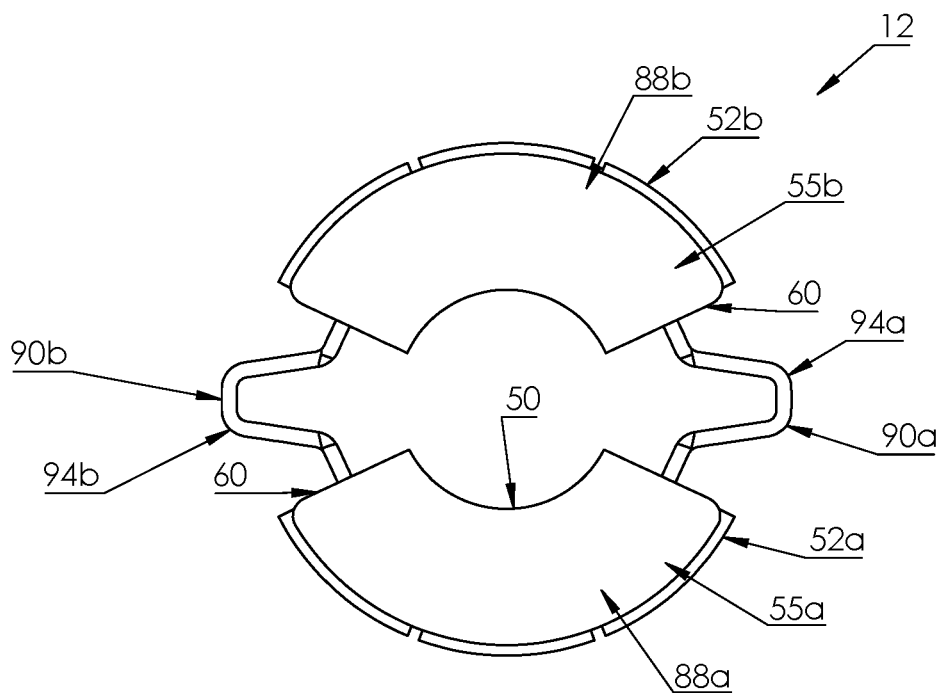
FIG. 31 is a bottom view of an expandable nut according to the present invention.
Figure 32:
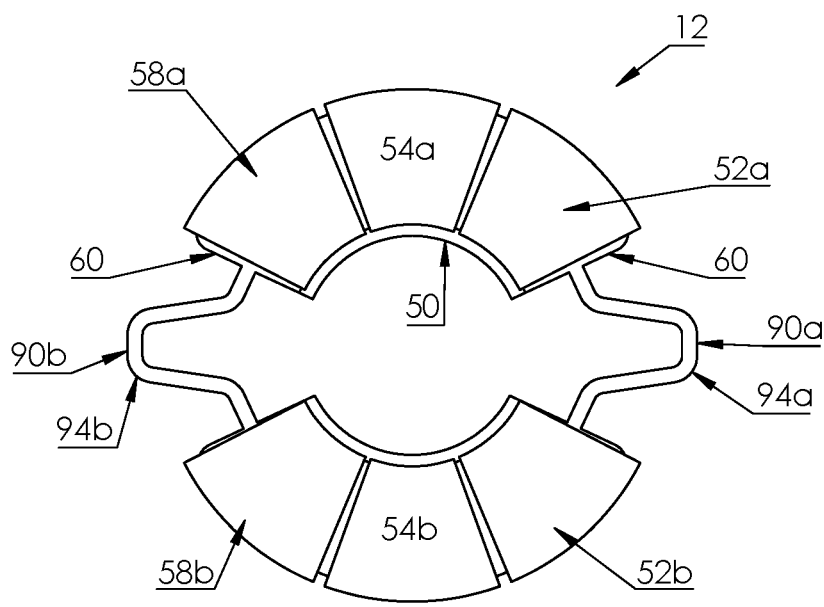
FIG. 32 is a top view of an expandable nut according to the present invention.
Figure 33:
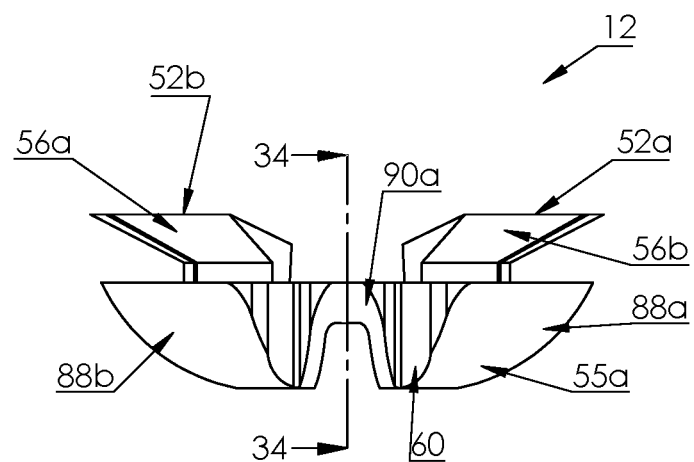
FIG. 33 is a side view of an expandable nut according to the present invention.
Figure 34:
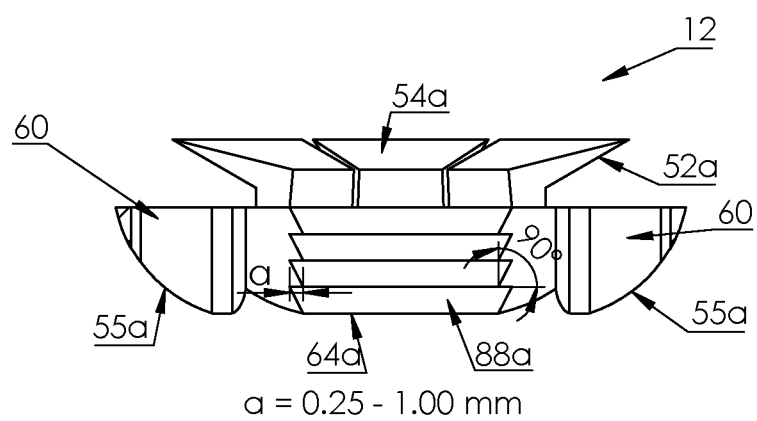
FIG. 34 is a cross-sectional view taken along line 34-34 of FIG. 33 of an expandable nut according to the present invention.
Figure 35:
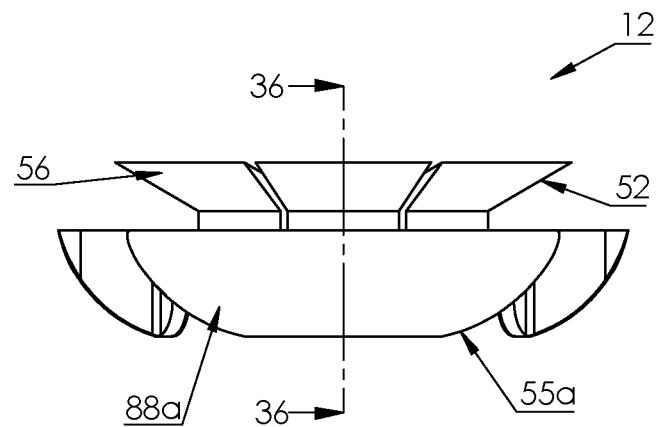
FIG. 35 is a side-elevational view of an expandable nut according to the present invention.
Figure 36:
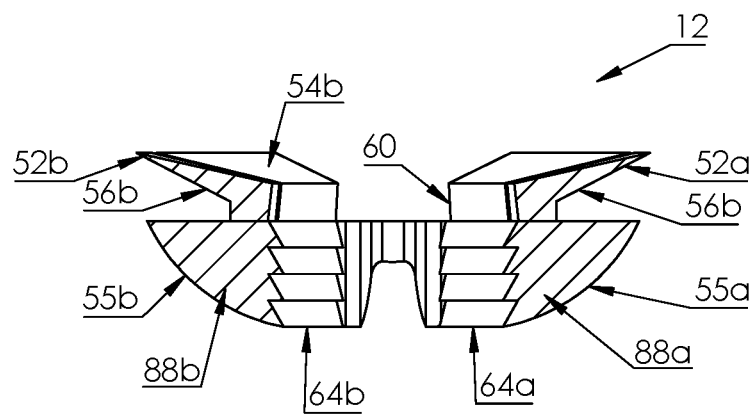
FIG. 36 is a cross-sectional view taken along line 36-36 of FIG. 35 of an expandable nut according to the present invention.

With particular reference to FIGS. 24, 27 and 28, the nut 12 includes ridges 64 that are sized and configured to complementarily engage and interlock with the segmented teeth 38 of the bolt 14. In the variation shown in FIGS. 24, 27 and 28, the ridges 64 are not segmented in a fashion similar to the toothed segments but are circumferential rings around the bore 50 as in the variation of FIGS. 1-17. In another variation, the ridges 64 are segmented to mirror or complement the checkerboard configuration of alternating toothed segments 96 and blank segments 98 around the surface of the bore 50 as shown in FIG. 26. In such a variation, the surface of the bore 50 includes toothed segments 96 that deflect independently against toothed segments 80 on the bolt which also deflect simultaneously in the non-engaged configuration. In yet another variation, the nut 12 is segmented into toothed segments 96 and blank segments 98 as shown in FIG. 26 and the bolt 14 is annularly stepped as in FIG. 3. Having toothed segments 80, 96 on the nut 12 and/or the bolt 14 advantageously permits each segment to deflect more easily because of the adjacent space available for expansion and movement of material into the blank segments as compared with deflecting an entire annular tooth 38 or entirely annular ridge 64.

The nut 12 of FIGS. 22-28 is the same nut 12 as in FIGS. 1-17. The height of a ridge 64 is defined as the outer diameter minus the inner diameter divided by two. The height is approximately 0.25-1.00 millimeters in length for the variation in FIGS. 22-28. The load-bearing face 70 is perpendicular to the central longitudinal axis. Both the load-bearing face 70 and the ramped face 72 form a triangle-shaped ridge 64 that extends outwardly from the outer diameter of the bore 50 and toward the central longitudinal axis and is formed around the cylindrical surface of the bore 50. In cross-section, each ridge 64 forms a scalene triangle in which the two sides of the triangle are of unequal length with the ramped face 72 being longer than the load-bearing face 70. The angle between the load-bearing face 70 and the ramped face 72 is approximately 60 degrees. In another variation the angle between the load-bearing face 70 and the ramped face 72 is between zero degrees and approximately 60 degrees. In another variation, the angle between the load-bearing face 70 and longitudinal axis is between 0 and 90 degrees. The engaged/locked configuration is shown in FIG. 27 wherein the toothed segments 80 are interlocked with the ridges 64 on the nut 12. The non-engaged/traversing configuration is shown in FIG. 28 wherein the alternating tooth segments 80 on the bolt 14 are simultaneously deflected with ridges 64 on the nut 12 as the tips 42, 66 pass each other.

Turning now to FIGS. 29-36, there is shown a variation of the nut 12 according to the present invention wherein like reference numbers are used to describe like parts. The nut 12 can be used with any of the variations of the bolt 14 depicted in FIGS. 1-28 with the nut 12 having ridges 64 sized and configured to match the teeth 28 of a corresponding bolt 14.

Still referencing FIGS. 29-36, the nut 12 includes a central bore 50 extending between a proximal end and a distal end of the nut 12 along the longitudinal axis. The bore 50 is cylindrical in shape and sized and configured to receive the shank 22 of the bolt 14. The nut 12 of FIGS. 29-36 is divided into two oppositely disposed halves. The two halves comprise two oppositely disposed ridged portions 88a, 88b with associated integral washer portions 52a, 52b. The ridged portions 88a, 88b are interconnected by two expandable portions 90a, 90b located between the two ridged portions 88a, 88b.

Each ridged portion 88a, 88b has a half dome-shaped head 55a, 55b. Each ridged portion 88a, 88b includes an associated half of a washer 52a, 52b. The washer halves 52a, 52b are integrally formed with corresponding ridged portions 88a, 88b. The washer 52a, 52b includes an upper surface 54a, 54b and a lower surface 56a, 56b meeting at a tapered outer perimeter. Openings 60 are formed dividing the nut 12 in half. The upper surfaces 54a, 54b and lower surfaces 56a, 56b are angled upwardly and together create a truncated conical upper surfaces 54a, 54b as described above. The upper surfaces 54a, 54b are slightly conical, concave, angled, curved, cone-shaped, spherical, domed or cupped and function together as a spring washer or conical washer which advantageously provides an axial force when deformed under compression. The conical shell of the washer 52a, 52b can be loaded in the longitudinal direction and the force transmission is generally concentric. In one variation, the washer halves 52a, 52b of the present invention are provided with a plurality of radial serrations dividing the washer 52a, 52b into segments or wings 58a, 58b. The wings 58a, 58b are configured to flex, deflect, bend, deform independently and provide a spring force in the opposite axial direction against a fastened object to improve the locking capabilities of the fastener 10 against the object. Unless plastically deformed, the washer 52a, 52b will return to its original undeflected configuration. The individual wings 58a, 58b can deflect independently and, thereby, the upper surface 54a, 54b can more closely conform to a non-smooth, irregular surface of a fastened object.

The internal surface of the bore 50 of the nut 12 is provided with a plurality of ridges 64 formed along the length of the bore 50. The ridges 64a, 64b are sized and configured to conform and mate with the teeth 38 formed on the shank 22 in an interlocking manner. Each ridge 64a, 64b is formed partially circumferentially around the bore 50 at a constant distance along the longitudinal axis of the nut 12. The bore 50 is not threaded as there is no helical shape formed by the ridges 64a, 64b. As previously mentioned, since there are no helical threads formed inside the nut 12, the lead is zero, that is, a revolution of the nut 12 of the present invention with respect to the bolt 14 around the longitudinal axis does not translate the nut 12 along the longitudinal axis. As such, each ridge 64 is a separate semi-circular or partially circular, partially annular, non-helical groove. A plurality of evenly distributed grooves is formed along the length of the bore 50 with each groove lying in separate parallel planes all of which are perpendicular to the longitudinal axis wherein the distance between adjacent parallel planes is called the pitch in the present invention. There are approximately 20-60 teeth per inch along the longitudinal axis. The length of the nut 12 and the number of ridges 64 is configured to provide sufficient locking strength to the nut 12. A greater number of ridges 64 on a nut 12 will provide greater locking strength between the nut and the bolt and the nut will be able to withstand larger axial loads. Also, a greater number of ridges along a correspondingly longer nut, will require greater force to move the nut along the bolt. Hence, the number of ridges 64 in the nut and the corresponding length of the nut is selected for a given application as needed to withstand the required amount of axial load in the distal direction to lock the nut with the nut still being movable on the bolt in the proximal direction without undue force. In one variation, there are approximately 4-6 ridges 64 in a nut 12. In another variation, there are at least 4 ridges 64. In another variation, there are 4-10 ridges 64 and, in another variation, there are at least 3 ridges. The configuration of the ridges 64 can be of any of the previous configurations described above wherein the triangular shape of the ridges 64 correspond to the triangular shape of the teeth 38 in order to interlock with each other as described in any of the variations above with respect to FIGS. 1-28.

The expandable portions 90a, 90b are configured to flex and to expand when depressed inwardly toward the central longitudinal axis. Expansion of the expandable portions 90a, 90b will move the oppositely disposed ridged portions 88 outwardly to release the ridges 64a, 64b from engagement with teeth 38 on the bolt 14. Thereby, this expandable nut 12 can be easily removed by sliding the nut 12 along the bolt 14 in either direction while the expandable portions 90a, 90b are compressed inwardly without having to cut bolt 14 to release the fastener 10 as described above. The nut 12 and bolt 14 remains unidirectional as the nut 12 is permitted only to slide on one direction towards the head 20 of the bolt 14 when the teeth 38 and ridges 64 are engaged in an engaged configuration. When the expandable portions 90a, 90b are depressed, the ridged portions 88a, 88b are configured to move radially outwardly by a sufficient distance to disengage the ridges 64a, 64b from the teeth 38 and permit removal of the nut 12. Each expandable portion 90a, 90b includes a U-shaped protrusion 94a, 94b forming a living hinge with the open end of the U-shape facing the bore 50. When the U-shaped protrusion is depressed with a finger or instrument, the U-shape will elongate and flatten moving the ridged portions 88a, 88b radially outwardly to disengage the ridged portions 88a, 88b from the bolt 14. Both expandable portions 90a, 90b are simultaneously compressed from opposite directions to increase the diameter of the bore 50. The expandable portions 88a, 88b can be compressed for removal of the nut 12 or for locating the nut 12 on the bolt 14. Furthermore, because the nut 12 is expandable, the nut 12 will expand by the force created when sliding over the teeth 38 on the bolt 14 similar to a rack-and-pawl. When in a non-engaged configuration, the teeth 38 and ridges 64 do not deflect or deflect less because the nut expands slightly outwardly as ridges 64 ramp over the teeth 38 when the nut 12 slides with respect to the bolt 14. Just sliding the nut with respect to the bolt provides sufficient force to expand the hinge and, hence, the diameter of the bore. The hinged expandable portion 88a, 88b will then snap back or return to its original unexpanded or less expanded configuration/diameter when the ridges 64 are interlocked between the teeth 38. As such, the nut 12 advantageously slides smoothly along the bolt and the expandable portions need not be compressed to locate the nut on the bolt.

The fastener 10 according to the present invention can be used wherever items are conventionally affixed by standard nuts and bolts. The fastener has broad applicability and can be employed in a variety of commercial applications and various scale sizes. The fastener of the present invention can reduce manufacturing costs of many consumer items especially items that are not intended for repair and re-assembly. The consumer items are not limited to consumer electronics, digital cameras, wireless headphones, video gaming accessories and a variety of other items that are assembled by hand or machine in factories. Many types of retail consumer products are currently manufactured with fasteners that require time and energy to assemble. These products will come apart when the fasteners loosen or fail. The fastener of the present invention can replace helically threaded fasteners in a variety of construction applications where the parts are expected to remain joined for lengthy periods of time without re-torquing. Some examples are beam and joist connections, electrical and plumbing systems, snap-together flooring, earthquake retrofitting, furniture, appliance footings, bridges, road signage and street lighting. Additionally, fasteners according to the present invention possess unique advantages in mechanical applications where rotation of armatures will cause helically threaded fasteners to vibrate loose and fail. These include but are not limited to motors and other machinery, robotic parts, and drive/suspension parts in cars, trucks, ships, helicopters, drones, airplanes, missiles and rockets. The fastener of the present invention can also serve as a rapid on-site retrofit repair for existing nuts and bolts that have failed. Other use-cases exist for the present invention in medical applications such as biocompatible stable bone fixation, orthopedics, plumbing, hose clamps, law enforcement, disposable single-use handcuffs, flat-pack shipping for easy and rapid assembly by the consumer, toys, snap-together models, cargo container inspection locks, emergency snap-together life rafts and shelters and aerospace applications where the fastener's light weight and easy push-fastening make it superior to torquing bolts in extreme environments and/or weightless conditions such as outer space.

The present invention overcomes the numerous disadvantages of conventional helically threaded nut-and-bolt fasteners. In particular, rotational force is not required to thread the nut onto the bolt, thereby, providing energy savings and simple and quick push-to-fasten assembly. The present invention avoids the need for specific tools, wrenches, screwdrivers and the like. A host of different tools are not required to attend to different types of conventional nut-and-bolt fasteners. Furthermore, rotational torque is not required and associated problems with under-torquing and over-torquing are avoided by the fastener of the present invention. Furthermore, bolts of the different lengths are not required for different applications because cutting a bolt of the present invention to an appropriate length is easily accomplished. There is no problem of cross-threading with the present invention that would damage and waste fasteners. Other damage to a conventional bolt and thread may arise from clamping the threads in which case would prevent a nut being removed from or placed on a bolt. In contrast, if some of the ridges or teeth of the present invention are damaged, the bolt and nut can advantageously still be fastened by engaging the non-damaged ridges and teeth or easily unfastened in ways described above. Also, the push-to-fasten fastener of the present invention can be easily employed in small spaces because leverage is not required to apply torque. Importantly, the fastener of the present invention will not loosen with time, vibration or rotation and, hence, the failure rate of the present invention will be much less than conventional nuts-and-bolts preventing accidents, saving money and lives.

It is understood that various modifications may be made to the embodiments of the fastener disclosed herein. Therefore, the above description should not be construed as limiting, but merely as exemplifications of preferred embodiments. Those skilled in the art will envision other modifications within the scope and spirit of the present disclosure.

I claim:

1. A fastener, comprising:
a bolt having a head at a proximal end and a cylindrical shaft extending from the head to a distal end along a central longitudinal axis; the head having a diameter larger than the shaft;
the bolt including toothed segments; each toothed segment having a tooth around the shaft and along the longitudinal axis; each toothed segment including individual teeth all having a load-bearing surface facing the proximal end;
the bolt including a plurality of blank segments without teeth interspersed between toothed segments around the shaft and along the longitudinal axis; and
a nut defining a cylindrical bore extending through the nut along the longitudinal axis from a proximal end to a distal end of the nut; the bore having a bore surface;
the bore being sized and configured to receive the shaft of the bolt inside the bore;
the nut including a plurality of teeth on the bore surface; each tooth on the nut having a load-bearing surface facing the distal end and sized and configured to abut against the load-bearing surfaces of the teeth on the shaft to prevent translation of the nut in the distal direction and allow translation of the nut in the proximal direction toward the head.

2. The fastener of claim 1 wherein the teeth on the bolt and on the nut are non-helical.

3. The fastener of claim 1 wherein the teeth on the bolt and on the nut are non-annular.

4. The fastener of claim 1 wherein the toothed segments are arranged in a checkerboard pattern interspersed with the blank segments.

5. The fastener of claim 1 wherein the toothed segments are arranged in a pattern with toothed segments alternating with the blank segments along the longitudinal axis and circumferentially around the shaft.

6. The fastener of claim 1 wherein the teeth on the bolt and the nut each have a ramped surface forming a triangular shape with the load-bearing surface.

7. The fastener of claim 1 wherein the teeth on the nut are arranged in toothed segments in a checkerboard pattern interspersed with blank segments.

8. The fastener of claim 1 wherein the teeth on the nut are arranged in a pattern with teeth alternating with the blank segments along the longitudinal axis and circumferentially around the bore.

9. The fastener of claim 1 wherein the load-bearing surfaces are perpendicular to the longitudinal axis.

10. The fastener of claim 1 wherein all the load-bearing surfaces on the teeth of the bolt are angled toward the proximal end at an angle of approximately between 0 and 90 degrees with the longitudinal axis and the load-bearing surfaces on the teeth of the nut are angled toward the distal end at an angle of approximately between 0 degrees and 90 degrees with the longitudinal axis.

11. A fastener, comprising:
a bolt having a head at a proximal end and a shaft extending from the head to a distal end along a central longitudinal axis; the head having a diameter larger than the shaft;
the bolt including a plurality of wedge-shaped teeth arranged evenly in rows and columns forming toothed segments around the shaft and along the longitudinal axis and extending outwardly from an inner diameter of the shaft; the toothed segments are interspersed with blank segments without teeth wherein in any given circumferential row or longitudinal column, toothed segments alternate with blank segments.

12. The fastener of claim 11 wherein the teeth in each row are coplanar perpendicular to the longitudinal axis.

13. The fastener of claim 11 further including a nut defining a central bore sized and configured to receive the shaft; the central bore having a plurality of ridges complimentarily sized and shaped to interlock between the teeth along the longitudinal axis.

14. The fastener of claim 13 wherein the ridges are sized and configured to engage with the teeth such that distal translation of the nut relative to the bolt is prevented.

15. The fastener of claim 13 wherein the teeth are sized and configured to flex with translation of the nut relative to the bolt and interlock between the ridges.

16. The fastener of claim 13 wherein the ridges are non-helical and arranged continuously circumferentially around the bore.

17. The fastener of claim 13 wherein the ridges are non-helical and arranged in ridged segments alternating with blank segments without ridges around bore.

18. The fastener of claim 13 wherein the ridges are configured to flex with translation of the nut relative to the bolt.

19. The fastener of claim 13 wherein the teeth are sized and configured to allow translation of the nut in the proximal direction toward the head.

* * * * *